(12) United States Patent
Eldessoki et al.

(10) Patent No.: US 12,143,322 B2
(45) Date of Patent: *Nov. 12, 2024

(54) JOINT TRANSMISSIONS OF DATA IN A WIRELESS COMMUNICATION SYSTEM USING A NON-ORTHOGONAL MULTIPLE ACCESS TRANSMISSION SCHEME

(71) Applicants: Fraunhofer-Gesellschaft zur Foerderung der angewandten Forschung e.V., Munich (DE); ETRI—Electronics and Telecommunications Research Institute, Daejeon (KR)

(72) Inventors: Sameh Eldessoki, Berlin (DE); Johannes Dommel, Berlin (DE); Wooram Shin, Berlin (DE); Thomas Haustein, Potsdam (DE); Lars Thiele, Berlin (DE); Young-Jo Ko, Daejeon (KR); Seungkwon Baek, Daejeon (KR); Chanho Yoon, Daejeon (KR)

(73) Assignees: Fraunhofer-Gesellschaft zur Foerderung der angewandten Forschung e.V., Munich (DE); ETRI—Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,237

(22) Filed: Jun. 12, 2023

(65) Prior Publication Data
US 2023/0353296 A1  Nov. 2, 2023

Related U.S. Application Data

(63) Continuation of application No. 16/994,357, filed on Aug. 14, 2020, now Pat. No. 11,716,179, which is a
(Continued)

(30) Foreign Application Priority Data

Feb. 15, 2018  (EP) .................................. 18157033

(51) Int. Cl.
*H04L 5/00* (2006.01)
*H04J 11/00* (2006.01)
(Continued)

(52) U.S. Cl.
CPC ........ *H04L 5/0037* (2013.01); *H04J 11/0053* (2013.01); *H04L 5/0035* (2013.01);
(Continued)

(58) Field of Classification Search
CPC . H04J 11/004; H04J 11/0053; H04L 27/2604; H04L 5/0035; H04L 5/0037; H04L 5/0069; H04W 52/346
See application file for complete search history.

(56) References Cited

U.S. PATENT DOCUMENTS 10,548,093 B2 *  1/2020  Benjebbour ........ H04W 52/248
2012/0236955 A1  9/2012  Zhou
(Continued)

FOREIGN PATENT DOCUMENTS

WO    2017050760 A1    3/2017

OTHER PUBLICATIONS

"Study on Downlink Multiuser Superposition Transmission (MUST) for LTE", 3GPP TR 36.859 v13.0.0, Dec. 2015 (Release 13), Dec. 2015, 48 pp.
(Continued)

*Primary Examiner* — Phuc H Tran
(74) *Attorney, Agent, or Firm* — Perkins Coie LLP; Michael A. Glenn

(57) ABSTRACT

A wireless communication system includes a first transmitter and a second transmitter. For a transmission or reception of
(Continued)

data of a first user equipment and data of a second user equipment on resources shared by the first user equipment and the second user equipment, the first transmitter is configured for a superimposed non-orthogonal multiple access, NOMA, transmission or reception of a first data signal of the first user equipment and a second data signal of the second user equipment, and the second transmitter is configured for a superimposed non-orthogonal multiple access, NOMA, transmission or reception of a third data signal of the first user equipment and a fourth data signal of the second user equipment.

20 Claims, 13 Drawing Sheets

Related U.S. Application Data continuation of application No. PCT/EP2019/053431, filed on Feb. 12, 2019.

(51) Int. Cl.
*H04L 27/26* (2006.01)
*H04W 52/34* (2009.01)

(52) U.S. Cl.
CPC ........ *H04L 5/0069* (2013.01); *H04L 27/2604* (2013.01); *H04J 11/004* (2013.01); *H04W 52/346* (2013.01)

(56) References Cited

U.S. PATENT DOCUMENTS

| | | | |
|---|---|---|---|
| 2017/0170914 A1 | 6/2017 | Saha | |
| 2019/0052309 A1* | 2/2019 | Schmidt | H04W 72/23 |
| 2019/0327607 A1 | 10/2019 | Xiao et al. | |
| 2020/0077402 A1* | 3/2020 | Lei | H04L 1/0003 |
| 2020/0389870 A1* | 12/2020 | Shin | H04W 48/08 |

OTHER PUBLICATIONS

Boviz, Dora , et al., "Effective Design of Multi-User Reception and Fronthaul Rate Allocation in 5G Cloud RAN", IEEE Journal on Selected Areas in Communications, 20170801 IEEE Service Center, Piscataway, US, vol. 35, No. 8, pp. 1825-1836, XP011656519, pp. 1825-1836.

CATT , "Candidate Solution for New Multiple Access", 3GPP TSG RAN WG1 Meeting #84bis, R1-163383, CATT, Apr. 2016, Apr. 2016, 4 pp.

Huawei , et al., "Sparse Code Multiple Access (SCMA) for 5G Radio Transmission", 3GPP TSG RAN WG1 Meeting #84bis, R1-162155, Apr. 2016, Apr. 2106, 5 pp.

Intel Corporation , "Multiple access schemes for new radio interface", 3GPP TSG RAN WG1 Meeting #84bis, R1-162385, Apr. 2016, Apr. 2016, 4 pp.

Islam, S. M. Riazul, et al., "(Part 1 of 2) Power-Domain Non-Orthogonal Multiple Access (NOMA) in 5G Systems: Potentials and Challenge", IEEE Communications Surveys & Tutorials IEEE, USA, 2016, vol. 19, No. 2, pp. 721-742, XP011651823, 2016, pp. 721-742.

Islam, S. M. Riazul, et al., "(Part 2 of 2) Power-Domain Non-Orthogonal Multiple Access (NOMA) in 5G Systems: Potentials and Challenge", IEEE Communications Surveys & Tutorials IEEE, USA, 2016, vol. 19, No. 2, pp. 721-742, XP011651823, 2016, pp. 721-742.

LG Electronics , "Considerations on DL/UL multiple access for NR", 3GPP TSG RAN WG1 Meeting #84bis, R1-162517, Apr. 2016, Apr. 2016, 4 pp.

Nokia , et al., "Contention-based non-orthogonal multiple access with frequency hopping for mMTC uplink", 3GPP TSG-RAN WG1 #85, R1-165020, May 2016, May 2016, 4 pp.

Nokia , et al., "Non-orthogonal multiple access for New Radio", 3GPP TSG-RAN WG1 #85, R1-165019, May 2016, May 2016, 6 pp.

Nokia , et al., "Performance of Interleave Division Multiple Access (IDMA) in Combination with OFDM Family Waveforms", 3GPP TSG-RAN WG1 #85, R1-165021, May 2016, May 2016, 5 pp.

NTT Docomo, Inc. , "Initial views and evaluation results on non-orthogonal multiple access for NR uplink", 3GPP TSG RAN WG1 Meeting #84bis, R1-163111, Busan, Korea Apr. 11-15, 2016;, Apr. 2016, 6 pp.

Qualcomm Inc. , "Candidate NR Multiple Access Schemes", R1-163510; 3GPP TSG-RAN WG1 #84b; #84b, Apr. 11-15, 2016; Busan, Korea, Apr. 2016, 8 pp.

Samsung , "Non-orthogonal Multiple access candidate for NR", 3GPP TSG RAN WG1 Meeting #85, R1-163992, May 2016, May 2016, 7 pp.

Zhang, Yi , et al., "Non-Orthogonal Multiple Access Assisted Multi-Region Geocast", IEEE Access IEEE, USA, 2017, vol. 6, pp. 2340-2355, XP011677508, pp. 2340-2355.

ZTE , "Discussion on multiple access for new radio interface", 3GPP TSG RAN WG1 Meeting #84bis, R1-162226, Apr. 2016, Apr. 2016, 12 pp.

\* cited by examiner

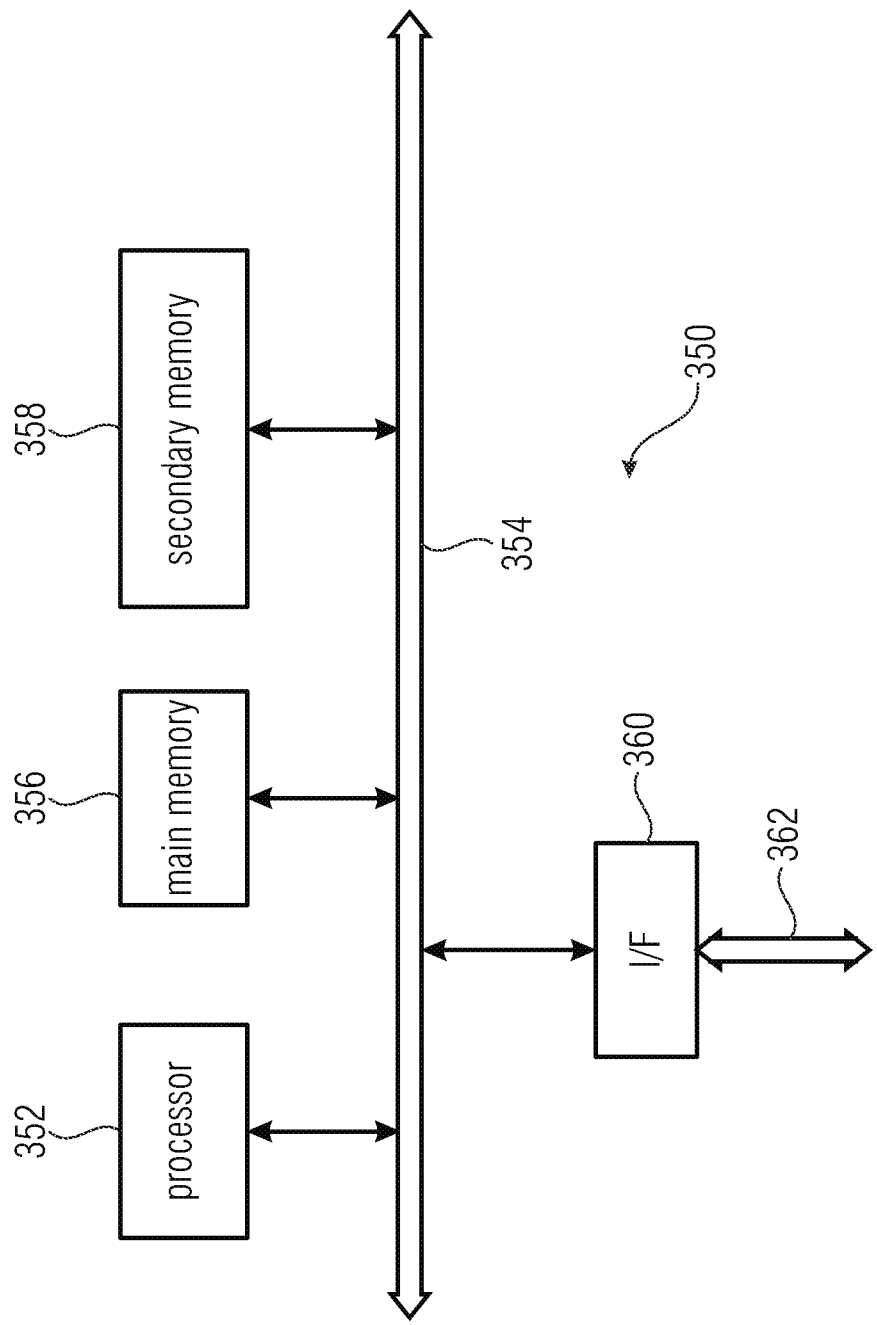

JOINT TRANSMISSIONS OF DATA IN A WIRELESS COMMUNICATION SYSTEM USING A NON-ORTHOGONAL MULTIPLE ACCESS TRANSMISSION SCHEME

CROSS-REFERENCE TO RELATED APPLICATIONS

This application is a continuation of copending U.S. patent application Ser. No. 16/994,357, filed Aug. 14, 2020, which in turn is a continuation of copending International Application No. PCT/EP2019/053431, filed Feb. 12, 2019, which are incorporated herein by reference in their entirety, and additionally claims priority from European Application No. EP 18157033.4, filed Feb. 15, 2018, which is also incorporated herein by reference in its entirety.

TECHNICAL FIELD

The present application concerns the field of wireless communications, more specifically the transmission and reception of data of a plurality of users or user equipments, UEs, on shared resources using joint transmissions and receptions using a non-orthogonal multiple access, NOMA, transmission or reception scheme.

BACKGROUND OF THE INVENTION

FIG. 1 is a schematic representation of an example of a wireless network 100 including a core network 102 and a radio access network 104. The radio access network 104 may include a plurality of base stations gNB, to gNB5, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station gNB4. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may be diversified in order to provide various types of communication services such as voice or data services. In general, the wireless communication system may be a multiple access system capable of sharing available system resources, e.g., bandwidth, transmission power or the like, to support the communication with multiple users. Examples of the multiple access system include a Code Division Multiple Access, CDMA, system, a Frequency Division Multiple Access, FDMA, system, a Time Division Multiple Access, TDMA, system, an Orthogonal Frequency Division Multiple Access, OFDMA, system, a Single Carrier Frequency Division Multiple Access, SC-FDMA, system, and the like. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referred to as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow $124_1$ and by the small cell base station $SeNB_1$, as indicated schematically by the arrow $124_2$.

In mobile communication systems or networks, for example, in those networks described above with reference to FIG. 1 and FIG. 2, like a LTE or a 5G/NR network, technologies for sharing available system resources, e.g., bandwidth, transmission power or the like, to support a communication with multiple users or user equipments include non-orthogonal multiple access, NOMA, schemes, for example, the downlink multi-user shared access, DL-MUST, scheme that is described, for example, in reference [1].

FIG. 3 is a block diagram illustrating the principle of the multi-user superposition transmission, MUST, scheme in accordance with reference [1]. The MUST scheme exploits the near-far effect and applies a power allocation for the user separation. For example, users which are close to a transmitter may be attributed with less power in the downlink when compared to users further away. The distance of a user to the transmitter may be determined by the actual geographical location of the user relative to the transmitter, or the distance may be determined in terms of path loss or signal attenuation on a channel between the user and the transmitter. The near user data $200_N$ for the near user and the far user data $200_F$ for the far user are independently processed, more specifically the near user data $200_N$ and the far user data $200_F$ are independently encoded using a near user constellation $202_N$ and a far user constellation $202_F$. The encoded near user data signal $204_N$ and the encoded far user data signal $204_F$ are applied to respective power allocation circuits $206_N$, $206_F$ have allocated thereto respective power levels. The power level allocated to the encoded far user data signal $204_F$ is higher than the power level allocated to the encoded near user data signal $204_N$. The near user data signal $208_N$ as processed by the power allocation circuit $206_N$ and the far user data signal $208_F$ as processed by the power allocation circuit $206_F$ are applied to a superposition circuit 210 superimposing the signals $208_N$ and $208_F$ thereby obtaining the superimposed signal 212 including the encoded first data signal for the near user and the encoded second data signal for the far user. The superimposed signal 212 is modulated in accordance with a predefined waveform 214 so as to obtain the final signal 216 that is transmitted via the radio link to the near user and to the far user. At the receiver side, the near user decodes and subtracts first the signal from the far user, which, as mentioned above, has the higher power signal when compared to the near user. The decoding and subtracting of the first signal from the far user is done prior to the decoding of the signal for the near UE. The far user decodes the superimposed signal, and the signal meant for the other user which is closer to the transmitter may be considered as an additional noise term or as a low level interference.

When considering, as an example, a situation in which data signals for two users are to be transmitted using the MUST scheme, both elementary or data signals share the same waveform for the modulation. The waveform needs to be selected or optimized for the user having the worst channel. This may be not an optimum selection for a user having a better channel. Selecting the waveform dependent on the worst user's channel may include providing an adaptive cyclic prefix, CP, for an OFDM transmission for compensating large delay spreads. In addition, the user grouping in terms of far user and near user is only based on the relative location, either determined by the path loss/signal attenuation or by the actual geographical location, but it does not take into consideration other UE characteristics.

Another technique enabling a dynamic coordination of the transmission and the reception of data over a variety of different transceivers, like base stations, is the coordinated multipoint, CoMP, transmission. The CoMP transmission allows for an improvement of the overall quality for the users as well as for an improvement of the utilization of the network as, basically, CoMP turns the inter-cell interference, ICI, into a useful signal, especially at cell boarders where performance may be degraded. For example, when applying a no-coherent joint transmission CoMP scheme (NCJT-CoMP) the messages for a user may be transmitted by two or more base stations on the same resource.

It is noted that the information in the above section is only for enhancing the understanding of the background of the invention and therefore it may contain information that does not form conventional technology that is already known to a person of ordinary skill in the art.

SUMMARY

An embodiment may have a user equipment configured for a communication in a wireless communication system, the wireless communication system having a plurality of user equipments and a plurality of transmission/reception points, TRPs, the plurality of TRPs having at least a first TRP and a second TRP, wherein the user equipment is a member of a group of user equipments, the group including two or more user equipments for which second order channel statistics, e.g. power levels such as a downlink Reference Signal Received Power, RSRP, or Received Signal Strength Indication, RSSI, or Reference Signal Received Quality, RSRQ, for at least one channel parameter between the first and second TRPs and the user equipment are within a certain range, or two or more user equipments which are in a certain geographical area or coverage footprint relative to the first and second TRPs, wherein the user equipment is configured to communicate with the first and second TRPs using first resources, the first resources being orthogonal to second resources used by another user equipment of the group, and wherein, for transmitting or receiving data of the user equipment, the user equipment is to transmit to or receive from the first TRP a first superimposed signal using the resources of the first TRP and having a data signal of the user equipment superimposed with a data signal of a further user equipment being a member of a further group of user equipments, and transmit to or receive from the second TRP a second superimposed signal using resources of the second TRP and having a further data signal of the further user equipment superimposed with a further data signal of the user equipment.

Another embodiment may have a transmission/reception point, TRP, for a wireless communication system data, the wireless communication system having a plurality of user equipments and a plurality of transmission/reception points, TRPs, the plurality of TRPs having at least a first TRP and a second TRP, wherein the TRP is to transmit or receive data of a first user equipment and of a second user equipment, the first user equipment being a member of a first group of user equipments, the first group including two or more user equipments for which second order channel statistics, e.g. power levels such as a downlink Reference Signal Received Power, RSRP, or Received Signal Strength Indication, RSSI, or Reference Signal Received Quality, RSRQ, for at least one channel parameter between the first and second TRPs and the user equipment are within a first range, or two or more user equipments which are in a first geographical area or coverage footprint relative to the first and second TRPs, and the second user equipment being a member of a second group of user equipments, the second group two or more user equipments for which second order channel statistics, e.g. power levels such as a downlink Reference Signal Received Power, RSRP, or Received Signal Strength Indication, RSSI, or Reference Signal Received Quality, RSRQ, for at least one channel parameter between the first and second TRPs and the user equipment are within a second range, or two or more user equipments which are in a second geographical area or coverage footprint relative to the first and second TRPs, and wherein, for transmitting or receiving data of the first user equipment and of the second user equipment, the TRP is to transmit to or receive a first superimposed signal using first resources and having a data signal of the first user equipment superimposed with a data signal of the second user equipment, the first resources orthogonal to second resources used by further user equipments of the first and second groups, and transmit to or receive a second superimposed signal using the first resources and having further data signal of the second user equipment superimposed with a further data signal first user equipment.

Another embodiment may have a wireless communication system having: a plurality of inventive transmission/reception points, TRPs, as mentioned above, and a plurality of inventive user equipments as mentioned above.

Another embodiment may have a method for transmitting or receiving data of a user equipment in a wireless communication system data, wherein the wireless communication system has a plurality of user equipments and a plurality of transmission/reception points, TRPs, the plurality of TRPs having at least a first TRP and a second TRP, wherein the user equipment is a member of a group of user equipments, the group including two or more user equipments for which second order channel statistics, e.g. power levels such as a downlink Reference Signal Received Power, RSRP, or Received Signal Strength Indication, RSSI, or Reference Signal Received Quality, RSRQ, for at least one channel parameter between the first and second TRPs and the user equipment are within a certain range, or two or more user equipments which are in a certain geographical area or coverage footprint relative to the first and second TRPs, and wherein the method has the steps of: communicating with the first and second TRPs using first resources, the first resources being orthogonal to second resources used by another user equipment of the group, and for transmitting or receiving data of the user equipment transmitting to or receiving from the first TRP a first superimposed signal using resources of the first TRP and having a data signal of the user equipment superimposed with a data signal of a further user equipment being a member of a further group of user equipments, and transmitting to or receiving from the second TRP a second superimposed signal using resources of the second TRP and comprising a further data signal of the further user equipment superimposed with a further data signal of the user equipment.

BRIEF DESCRIPTION OF THE DRAWINGS

Embodiments of the present invention will be detailed subsequently referring to the appended drawings, in which:

FIG. 5a-b illustrates a power allocation matrix for the multi-user multi-connectivity scenario of FIG. 4, wherein FIG. 5(a) illustrates the power allocation matrix, and FIG. 5(b) illustrates the power allocation per UE;

FIG. 7a-b shows an embodiment extending the scenario of FIG. 6 to a 4 user/2 transmitter scenario, wherein FIG. 7(a) shows a scenario as in FIG. 6 extended by two additional users, and FIG. 7(b) shows an example of the power allocation matrix, similar to the embodiment of FIG. 5, as it may be used for sharing the information of the NOMA/OMA resource allocation between the UEs and TRPs in the scenario of FIG. 7(a);

FIG. 12 illustrates an example of a computer system on which units or modules as well as the steps of the methods described in accordance with the inventive approach may execute.

DETAILED DESCRIPTION OF THE INVENTION

Figure 1:
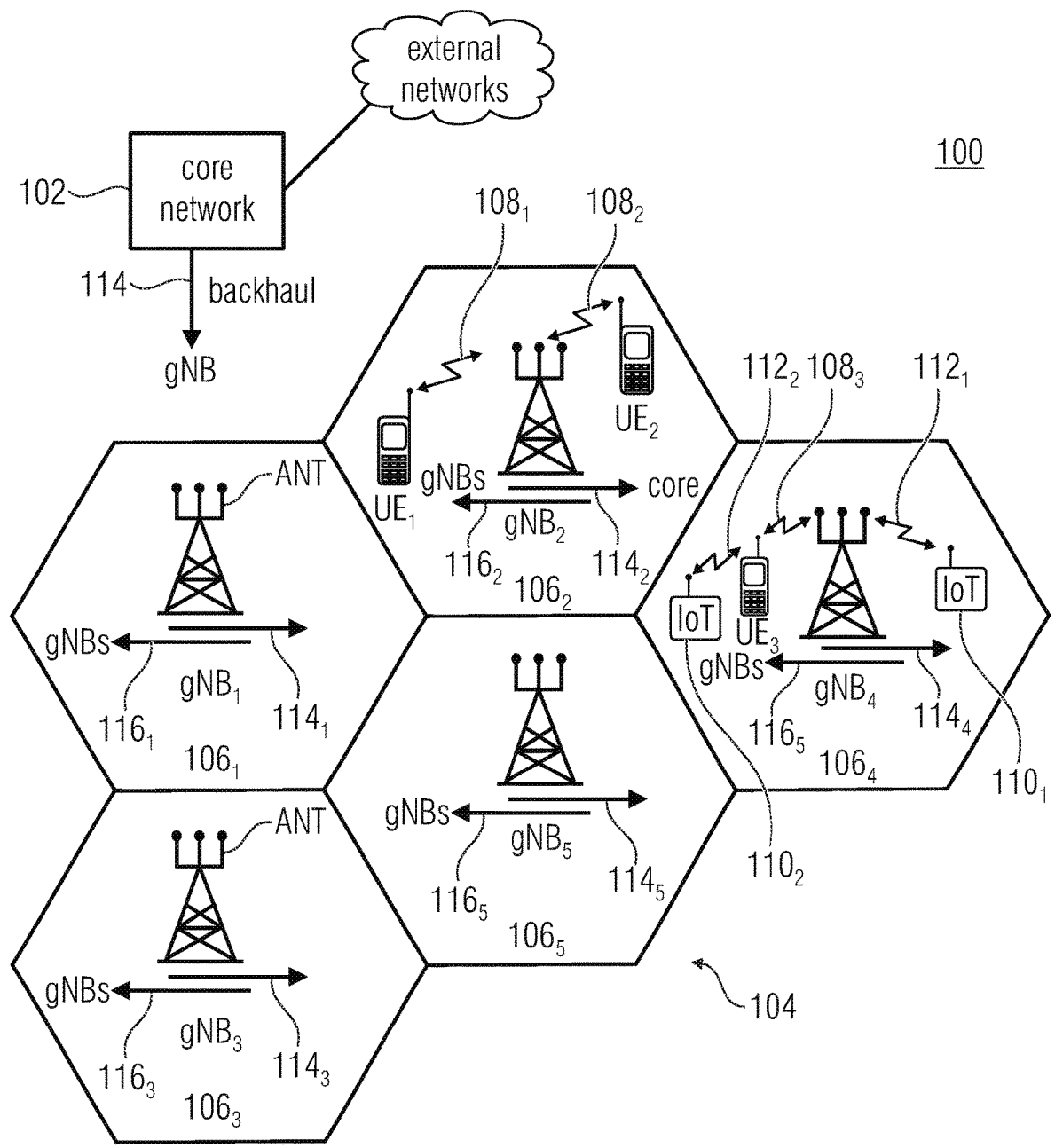
FIG. 1 shows a schematic representation of an example of a wireless communication system.

Embodiments of the present invention is now to described in more detail with reference to the accompanying drawings in which the same or similar elements have the same reference signs assigned.

Wireless Communication System/Method

The present invention provides a wireless communication system, comprising:
- a plurality of transmitters, the plurality of transmitters including at least a first transmitter, and a second transmitter,
- wherein, for a transmission or reception of data of a first user equipment and data of a second user equipment on resources shared by the first user equipment and the second user equipment, the first transmitter is configured for superimposed non-orthogonal multiple access, NOMA, transmission or reception of a first data signal of the first user equipment and a second data signal of the second user equipment, and the second transmitter is configured for superimposed non-orthogonal multiple access, NOMA, transmission or reception of a third data signal of the first user equipment and a fourth data signal of the second user equipment.

The present invention provides a method for transmitting or receiving in a wireless communication system data of a first user equipment and data of a second user equipment on resources shared by the first user equipment and the second user equipment, the method comprising:
- transmitting or receiving a first data signal of the first user equipment and a second data signal of the second user equipment by a first transmitter using a superimposed NOMA transmission or reception, and
- transmitting or receiving a third data signal of the first user equipment and a fourth data signal of the second user equipment by a second transmitter using a superimposed NOMA transmission or reception.

The present invention provides a wireless communication system, comprising:
- a plurality of transmitters, the plurality of transmitters including at least a first transmitter and a second transmitter,
- a first group of user equipments, the first group including at least one user equipment, and all user equipments within the first group using orthogonal resources,
- a second group of user equipments, the second group including at least one user equipment, and all user equipments within the second group using orthogonal resources,
- wherein at least one user equipment in the first group and at least one user equipment in the second group share the same orthogonal resources, and
- wherein, for transmitting or receiving data of a first user equipment in the first group and data of a second user equipment in the second group on resources shared by the first user equipment and the second user equipment, the first transmitter is configured to transmit or receive a first superimposed signal including a first data signal of the first user equipment and a second data signal of the second user equipment, and the second transmitter is configured to transmit or receive a second superimposed signal including a third data signal of the first user equipment and a fourth data signal of the second user equipment.

The present invention provides a method for transmitting or receiving in a wireless communication system data of a first user equipment and data of a second user equipment on resources shared by the first user equipment and the second user equipment, the method comprising:
- grouping into a first group user equipments, the first group including at least one user equipment, and all user equipments within the first group using orthogonal resources,
- grouping into a second group user equipments, the second group including at least one user equipment, and all user equipments within the second group using orthogonal resources,
- transmitting or receiving, by a first transmitter, a first superimposed signal including a first data signal of the first user equipment and a second data signal of the second user equipment, and
- transmitting or receiving, by a second transmitter, a second superimposed signal including a third data signal of the first user equipment and a fourth data signal of the second user equipment.

The present invention provides a transmitter, wherein
- for a transmission or reception of data of a first user equipment and data of a second user equipment on resources of a wireless communication system which are shared by the first user equipment and the second user equipment, the transmitter is configured to transmit or receive data of the first user equipment and data of the second user equipment, wherein further data of the first and second user equipments is transmitted by or received at a further transmitter of the wireless communication system, and
- the transmitter is configured to transmit or receive a superimposed signal including a first data signal of the first user equipment and a second data signal of the second user equipment.

The present invention provides a user equipment, wherein
- the user equipment is configured to share with a further user equipment resources of a wireless communication system,
- the user equipment is configured to receive data from a plurality of transmitters of the wireless communication system,
- the user equipment is configured to receive and process a first superimposed signal from the first transmitter and a second superimposed signal from the second transmitter so as to obtain from the first and second superimposed signals the data designated for the user equipment, and
- the first superimposed signal includes a first data signal of the user equipment and a data signal of the further user equipment, and the second superimposed signal includes a second data signal of the user equipment and a data signal of the further user equipment.

In accordance with the inventive approach, rather than using multi-user shared access schemes, like MUST, or coordinated multipoint transmission schemes like CoMP, separately, which offers either an improvement in efficiency or an improvement in reliability, the present invention teaches an approach combining the advantages of these approaches so as to provide both for a more efficient and for a more reliable communication. In other words, the inventive approach suggests combining the joint transmission scheme, like CoMP, with a non-orthogonal multiplex access, NOMA scheme, like MUST. When considering a plurality of transmission/reception points, TRPs, like base stations or other kinds of transmitters or receivers within a wireless communication network, two or more of such TRPs form a coordinated cluster, like a CoMP cluster, serving a specific area. In this area, multiple users or user equipments are distributed and grouped. The user grouping may be established based on second order channel statistics, for example, dependent on a path-loss or signal attenuation on the channel from one UE to the respective transmitter. In accordance with other embodiments, the user grouping may be based on the geographical location of the user, for example, in such a way that users within a specific geographical area are grouped together, and the respective areas have respective distances to the transmitters. A minimum size of a group is one UE, i.e., one user per group. Additionally, each user within a group is associated with a set of UEs, and all users associated with one certain set share the same physical resource(s), e.g. the same time and frequency resource elements, REs. The available number of orthogonal resources may limit the number of supported users per group and the number of users per group may then be equal to the number of sets in the system.

The inventive approach is advantageous as it provides for an increased spatial diversity and redundancy of the transmitted/received signals. In accordance with embodiments signal interference cancellation, SIC, techniques are employed together with different transmit powers to support the process of interference cancellation when needed, which is advantageous as this provides for a spectrally efficient transmission of signals. It is noted that the present invention is not limited to successive interference cancellation schemes for decoding the data at the near user, rather other techniques may be employed, for example, successive interference cancellation (SIC)—see e.g., [R1-163111], parallel interference cancellation (PIC), message passing (MPA)—see e.g., [R1-162155] or elementary signal estimation (ESE)—see e.g., [R1-165021]. Yet another advantage of the inventive approach is that it may be easily implemented into existing and future wireless communication networks. Further, the user grouping and the pairing and power allocation of the groups according to the MUST scheme may improve system efficiency and reliability.

It is noted that the inventive approach is not limited to the MUST scheme applying respective power levels to the signals to be superimposed or to a scheme applying different spreading sequences to the signals to be superimposed, rather any other non-orthogonal multi-access schemes may be applied, for example by applying different spreading sequences (e.g. SCMA), different interleaver/scrambling sequences (IDMA) or different power allocation (NOMA). Other techniques are indicated in the following table:

| Schemes | TDoc |
| --- | --- |
| SCMA Sparse Carrier Multiple Access | R1-162155 |
| RSMA Resource Shared Multiple Access | R1-163510 |
| MUSA Multi User Shared Access | R1-162226 |
| NOMA Non-orthogonal Multiple Access | R1-163111 |
| NCMA Non-orthogonal Coded MA | R1-162517 |
| PDMA | R1-163383 |
| Frequency spreading based non-orthogonal multiple access | R1-162385 |
| NOCA | R1-165019 |
| IDMA | R1-165021 |
| Frequency hopping based access | R1-165020 |
| IGMA | R1-163992 |

In accordance with the inventive approach, the combination of the joint transmission scheme with the non-orthogonal multiple access transmission scheme is achieved by providing, in accordance with embodiments, a user grouping. The transmission/reception points may agree on the grouping of users to a specific group, for example, based on specific properties like second order channel statistics, for example path-loss or signal attenuation on the respective channels, or on the basis of the respective geographical locations of the users so that users within a certain area are grouped into a common group. The location or geographical location of a user may be determined or estimated by the transmitter using, for example, the reference signal received power, RSRP, and the reference signal received quality, RSRP. In accordance with other embodiments, the geographical location may be obtained by conventional LTE positioning protocols.

In accordance with embodiments, user equipments are assigned to the first group and to the second group dependent on:
  second order channel statistics for the channels from the
    user equipment to the first and second transmitters
    being within a first range or being within a second
    range, or
  a geographical location of the user equipment being in a
    first geographical area or being in a second geographical area relative to the first and second transmitters, or
  higher layer procedures specifying the group to which the
    user equipment is to be assigned, e.g., higher layer
    procedures implemented by a radio resource management entity or an application communicating with or
    running on the user equipment.

In accordance with embodiments,
  the first data signal of the first user equipment and the
    second data signal of the second user equipment are
    transmitted and received by the first transmitter using a
    superimposed NOMA transmission or reception, and
  the third data signal of the first user equipment and the
    fourth data signal of the second user equipment are
    transmitted and received by the second transmitter
    using a superimposed NOMA transmission or reception.

In accordance with embodiments,
  in case a location of a user equipment in the wireless
    communication system is not known, the first transmitter and the second transmitter are configured to obtain
    one or more measurements, to locate a user equipment
    on the basis of the measurement, and to group user
    equipments according to their physical locations, and
  the measurement may include, e.g., a measurement of one
    or more of a reference signal received power, RSRP, a
    reference signal received quality, RSRQ, an angle of
    arrival, AoA, an angle of departure, AoD, or a delay of
    arrival, DoA.

In accordance with embodiments, in case a location of a user equipment in the wireless communication system, is fixed and known, the user equipment is associated with a predefined group ID indicating the group to which the user equipment belongs.

In accordance with embodiments, the first transmitter and the second transmitter are configured to exchange information for controlling transmission of signals among the transmitters and the user equipments. For example, the exchange of information may be via the X2, S1 or PC % interface or may make use of one or more higher layer procedures.

In accordance with embodiments, the exchanged information includes one or more of
- feedback information from the nearest groups regarding the relative phases of the transmitters serving the user equipments in the groups so as to ensure that signals transmitted by the transmitters are received coherently at the groups, or
- the average path loss, received power etc. to the user equipments in a group, or
- spatial properties of a multiple input multiple output, MIMO, link between a transmitter and user group, or
- information indicating when the respective transmitters are planning to transmit, or
- an indicator matrix indicating a resource allocation between the transmitters and the user equipments, or
- power allocation matrix and precoding matrix indices chosen by each group.

In accordance with embodiments,
- a user equipment in a group is configured to provide a feedback to a transmitter that is nearest to the user equipment, the feedback including one or more of:
  - a relative phase between each user equipment in the group and the transmitters serving the user equipments in the group, or
  - a precoding matrix index, or
  - a power allocation matrix index; and
- the first transmitter and the second transmitter are configured to exchange the received feedback and to use the received feedback for controlling the superimposed NOMA transmission or reception, e.g. to ensure a coherent DL transmission.

In accordance with embodiments, the feedback is based on a sounding reference signal, SRS.

In accordance with embodiments, the first transmitter and the second transmitter are configured to signal to the respective groups information to be used by the user equipments in a group to allow for a correct decoding and SIC processing of the received superimposed signals.

In accordance with embodiments, the information signaled by the transmitters includes a type of waveform, WF, used for modulating the data of respective user equipments at the transmitter.

In accordance with embodiments, the first transmitter and the second transmitter are configured to form a coordinated cluster, like a CoMP cluster, serving an area in which the first and second user equipments are distributed and grouped.

In accordance with embodiments, the wireless communication system comprises a backhaul connection connecting the first transmitter and the second transmitter.

As mentioned above, the inventive approach provides for a joint transmission scheme combined with a non-orthogonal multiple access scheme. In accordance with embodiments, a non-coherent joint transmission CoMP scheme may be used which may operate without a backhaul. However, in accordance with embodiments, like in the case of a coherent downlink transmission, additional signaling between the TRPs may be needed. Such a signaling may be performed using the backhaul connections between the plurality of transmitters, for example, the backhaul connections described above with reference to FIG. 1.

In accordance with embodiments,
- the second order channel statistics include one or more selected second order channel statistics, like path-loss or signal attenuation on a channel, the second order channel statistics within the first range including values for the second order channel statistics being the same or being similar in that the values are within a predefined range of values, and the second order channel statistics within the second range including values for the second order channel statistics being the same or being similar in that the values are within a predefined range of values, or
- the first geographical area is located at a first distance from the first transmitter and at a second distance from the second transmitter, and second first geographical area is located at a third distance from the first transmitter and at a fourth distance from the second transmitter, at least the first and third distances being different from the second and fourth distances, and
- each group has a distinct group ID.

In accordance with embodiments, the first group and/or the second group include a plurality of user equipments.

In accordance with embodiments, the user equipments which share a resource are associated with a certain set from a number of sets in the system, the number of user equipments per group being equal the number of sets in the system.

In accordance with embodiments, the first data signal and the third data signal of the first user equipment include parts of the data or the same data, like a copy of the data, for the first user equipment, and the second data signal and the fourth data signal of the second user equipment include parts of the data or the same data, like a copy of the data, for the second user equipment. This embodiment may provide a form of diversity transmission to increase robustness, e.g., an increased individual wireless robustness for narrow band, NB, IOT approaches in which frequency diversity is not available.

In accordance with embodiments,
- the orthogonal resources are defined by an orthogonal multiple access, OMA, transmission scheme of the wireless communication system, like TDMA, FDMA, OFDMA, CDMA, or SDMA, and
- the at least one user equipment in the first group and the at least one user equipment in the second group, which share the same orthogonal resources, employ non-orthogonal resources defined according to a selected non-orthogonal multiple access, NOMA, transmission scheme, like a NOMA transmission scheme applying different power levels to the signals to be superimposed or a NOMA transmission scheme applying different spreading sequences to the signals to be superimposed.

In accordance with embodiments, the transmitters and the user equipments are configured to share an indicator matrix, the indicator matrix indicating a NOMA/OMA resource allocation between the transmitters and the user equipments, the indicator matrix including the resource allocation for each transmitter/user equipment pair.

In accordance with embodiments, the user equipments are configured to process the superimposed signals received from the transmitters, e.g. by using successive interference cancellation, SIC, to remove an interfering message.

In accordance with embodiments, one or more of the user equipments includes a plurality of antennas and is configured to perform Rx beamforming in order to separate signals received from different transmitters.

In accordance with embodiments, for an uplink transmission, a time delay between the user equipments in different groups is set to be within the CP duration so that no coordination is needed and the signals arrive at the transmitters coherently.

In accordance with embodiments, for an uplink transmission,
- one user equipment form each group is configured to share the resources, like the same time and frequency resource elements, but each user equipment is configured to transmit its own unique data, and/or
- one or more of the user equipments are configured to transmit signals to the transmitters serving the user equipments.

In accordance with embodiments, for an uplink transmission,
- one or more of the user equipments are configured to transmit signals using a transmission at regular intervals or an event triggered transmission,
- in case of using a regular transmission interval, e.g. for a continuous monitoring using sensors, a transmission interval is selected and fixed for a group, and the selected transmission interval may be communicated to the group during a connection setup phase by the nearest transmitter, and
- in case of using an event triggered transmission, one or more of the user equipments are configured to switch to an orthogonal transmission scheme or to transmit a signal with a maximum allowed power.

In accordance with embodiments, for an uplink transmission, the transmitters are configured to exchange information including a NOMA layer ID, the NOMA layer ID indicating a sequence index per user equipment UE.

The inventive approach, in accordance with embodiments, provides for a signaling in the downlink for the coordinated transmission of the data among the transmitters and users, which may be exploited for the uplink. Likewise, a signaling in the uplink for the coordinated transmission of the data among the transmitters and users may be exploited for the downlink. For example, the signaling provided during the downlink that is used by the receivers in the respective UEs may also be used for the uplink scenario to allow for a coherent transmission during the uplink. In a similar way, the signaling provided during the uplink that may be used to obtain feedback from the different groups at the respective transceivers. The feedback may be used for a coherent transmission in the downlink scenario. For example the information may be used to select suitable transmission parameters for the downlink, like a suitable power allocation matrix for NOMA schemes operating on the basis of different power levels allocated to the respective data signals.

In accordance with embodiments, the plurality of transmitters includes at least one further transmitter, and
- the wireless communication system further includes at least one further group of user equipments having second order channel statistics within a specific range for the channels to the transmitters serving the user equipments in the further group or being located in a further geographical area relative to the transmitters serving the user equipments in the further group, the further group including at least one user equipment, and all user equipments within the further group using orthogonal resources.

In accordance with embodiments, data of one or more of the user equipments is transmitted using superimposed signals from the first transmitter, the second transmitter and the further transmitter, the superimposed signals including data signals user equipment and for other user equipments sharing the same resource.

In accordance with embodiments,
- the user equipment comprises one or more of a mobile or stationary terminal, an IoT device, a ground based vehicle, an aerial vehicle, a drone, a building and any other item or device provided with network connectivity enabling the item/device to communicate using the wireless communication network, like a sensor or actuator, and
- the plurality of transmitters comprises one or more of a macro cell base station, a small cell base station and a transmission/reception point, TRP, enabling an item or a device provided with network connectivity to communicate using the wireless communication network.

In accordance with embodiments, the wireless communication system uses an Inverse Fast Fourier Transform, IFFT, based signal, wherein the IFFT based signal includes OFDM with CP, DFT-s-OFDM with CP, IFFT-based waveforms without CP, f-OFDM, FBMC, GFDM or UFMC.

In accordance with embodiments, the plurality of transmitters are separate entities, like separate base stations or separate TRPs, or the plurality of transmitters are formed of one or more antennas or antenna elements of a common entity, like a base station or a TRP.

Computer Program Product

The present invention provides a computer program product comprising instructions which, when the program is executed by a computer, cause the computer to carry out the one or more methods of in accordance with the present invention.

The inventive approach as described herein may be used for smart city situations in which a high number of UEs or receivers is provided, for example, in the form of traffic lights or other types of sensors/activators. Another scenario where the inventive approach may be implemented is a Giga-factory approach including a plurality of UEs/receivers for the transmission of sensor based data, for example temperature data, pressure data and the like, from various locations or machines within the factory.

Figure 4:
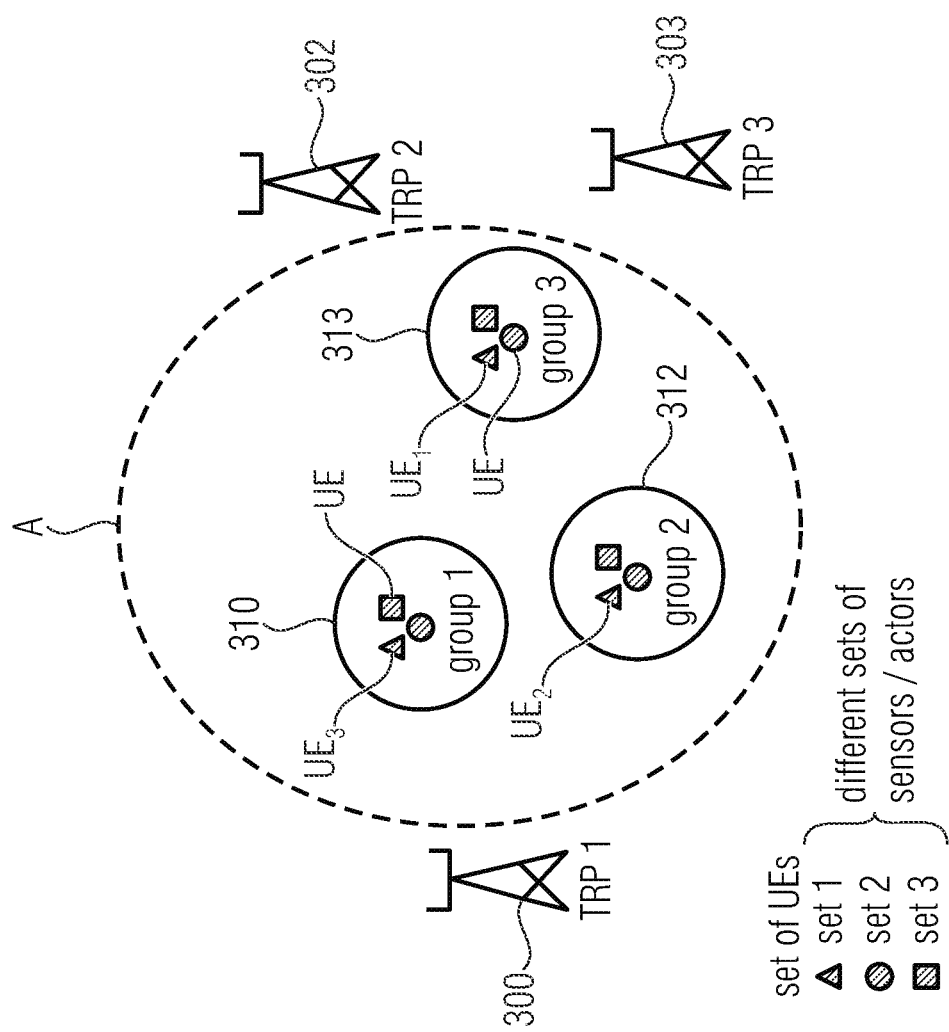
FIG. 4 illustrates a multi-user multi-connectivity scenario in accordance with an embodiment of the present invention.

Embodiments of the inventive approach will now be described in more detail, and FIG. 4 illustrates a multi-user multi-connectivity scenario in accordance with an embodiment of the present invention. FIG. 4 illustrates a part of a wireless communication system, like the wireless communication system described with reference to FIG. 1 or with reference to FIG. 2, including a first transmitter 300, also referred to as transmission/reception point, TRP, a second transmitter 302 and a third transmitter 303. The transmitters may also be transceivers, like base stations or other entities in the wireless communication network allowing for an access of users via radio communication links to the communication network. A plurality of UEs is grouped into a first group 310, a second group 312 and a third group 313. Each group includes three UEs as represented by the triangles △, circles ○, and squares □. Each group includes one UE of one type or one set, i.e., the UEs represented as triangles form a first set △, the UEs represented as circles form a second set ○, and the UEs represented as squares form a third set □. In accordance with embodiments of the present invention a joint transmission CoMP scheme is combined with a non-orthogonal multiple access scheme, and the three transmitters 300, 302 and 303 form a coordinated cluster serving the area A in which the groups 310, 312, 313 of UEs are located. The UEs may be grouped dependent on second order channel statistics, for example on the basis of the path-loss or the signal attenuation on the one or more channels from a UE to one or more of the transmitters 300, 302, 303. In accordance with other embodiments, the UEs may be grouped dependent on their actual geographical location so that UEs that are within a specific area which is at a certain distance from the respective transmitters are grouped accordingly. Although FIG. 4 shows three groups, each of which includes three UEs it is noted that the minimum size of a group is one, i.e., one user or UE per group. Further, as mentioned above, each user within a group is associated with a set, for example UEs of similar type, like sensors or actuators, are associated with one specific set that is selected from a plurality of available sets. For example all traffic lights within different groups are associated to one specific set. All users associated with a certain set share the same resource for receiving a transmission from the transmitters 300 to 303. For example, when considering the UEs represented by the triangles in the respective groups, each of the UEs receives from two or more of the transmitters 300 to 303 a superimposed signal including a plurality of data signals, namely a data signal for each of the UEs represented by a triangle. In other words, the respective data signals for each of the UEs represented by a triangle are superimposed and transmitted on a common resource or a shared resource. In accordance with embodiments, the available number of orthogonal resources may limit the number of supported users per group, and the number of users per group may be equal the number of sets in the system.

Thus, in accordance with the inventive approach, embodiments provide for a multi-user multi-connectivity scenario in which the following definitions apply:
(1) Group: multiple users sharing similar second order channel statistics, for example path-loss or signal attenuation on a channel, or being located at similar geographical locations. In accordance with embodiments, each group has a distinct group ID.
(2) Set: users in different groups sharing the same resource. In accordance with the embodiments using distinct group IDs each user of a certain set has a distinct group ID.
(3) OMA Resource: the orthogonal resource as defined by the multiple access transmission scheme used in the communication system, for example TDMA, FMDA, OFDMA, CDMA, SDMA.
(4) NOMA resource: non-orthogonal resources defined according to the underlying NOMA scheme, for example NOMA schemes operating on the basis of a power allocation, like MUST, or on the basis of sequences, like schemes using different spreading sequences. In accordance with embodiments other NOMA schemes may be applied, e.g., those NOMA schemes mentioned above.

Thus, in accordance with the inventive approach, within a group all UEs are multiplexed on orthogonal resources so that each UE within one group communicates with the CoMP cluster on orthogonal resources using OFDMA, TDMA, CDMA or similar schemes. Multiplexing between the groups is established using NOMA transmission schemes and all users within one set are multiplexed using NOMA, for example by applying a power domain superposition using the MUST approach so that all users within the same set share the same OMA resource.

In the subsequent description of the further embodiments of the present invention OFDMA is assumed to be used for multiplexing within the same group and the power-domain NOMA (MUST) transmission scheme is assumed for multiplexing within the same set. However, the inventive approach is not limited to such a combination; rather any other combination of OMA/NOMA may be applied.

Figure 5:
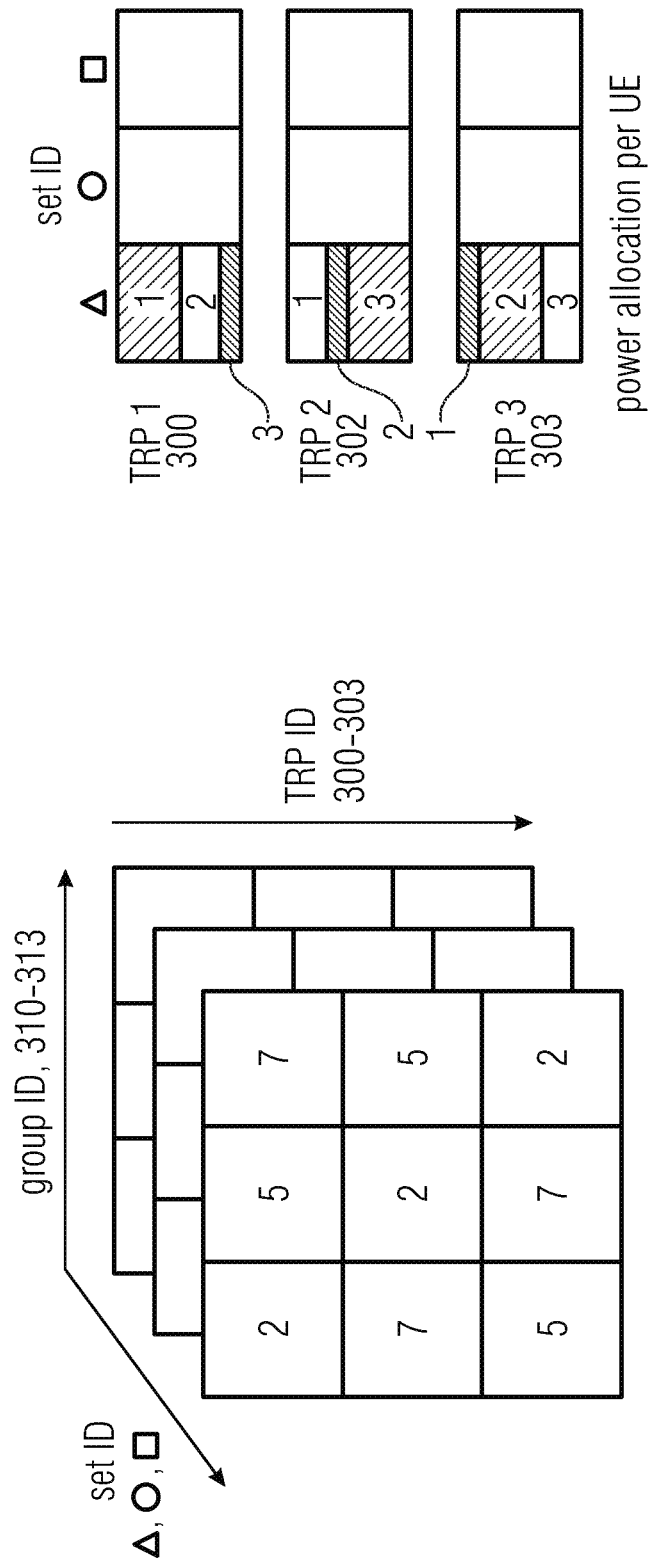

In accordance with the inventive approach, multiplexing within one set of UEs is performed in a non-orthogonal fashion, and the respective UEs sequentially decode a plurality of messages, namely those messages belonging to the other UEs within the same set, remove the messages form the superimposed signal and decode the message intended for the UE from the received signal now devoid of the messages belonging to the other UEs within the same set. In accordance with embodiments of the present invention, a specific resource allocation is provided for coordinating the use of NOMA resources between the transmitters, groups and sets. An indicator matrix is provided to share the information of NOMA/OMA resource allocation between the UEs and the transmitters or TRPs. FIG. 5 illustrates a power allocation matrix, which is an example of the just-mentioned resource allocation matrix, for the multi-user multi-connectivity scenario of FIG. 4. FIG. 5($a$) illustrates the power allocation matrix, and FIG. 5($b$) illustrates the power allocation per UE. The power allocation matrix indicates for each combination of set, group and transmitter the power level, as indicated by the numbers 2, 5, 7, which is allocated to signals transmitted from the respective transmitter to a specific UE within a certain group and a certain set. FIG. 5($b$) illustrates the power allocation by the respective transmitters 300 to 303 for the UEs associated with the first set Δ illustrated in FIG. 4 by the triangles. The numbers 1, 2 and 3 refer to a first UE1, a second UE2 and a third UE3 of the first set Δ.

The first transmitter 300 allocates the highest power to UE1, less power to UE2 and even less power to UE3. Thus, UE1 is in the third group 313 which is located the furthest away from the transmitter 300, UE3 is in the first group 310 which is closest to the transmitter 300, and UE2 is in the second 312 located at an intermediate distance from the first transmitter. When referring to the distance, this may mean that the respective UEs are located at specific geographical locations having different distances to their respective transceivers, or that the UE1 has the highest path-loss or signal attenuation for a signal received from the first transmitter 300, the UE2 has an intermediate path-loss or signal attenuation for a signal received from the first transmitter 300, and the UE2 has the lowest path-loss or signal attenuation for a signal received from the first transmitter 300. The high path-loss or signal attenuation does not necessarily mean that UE1 is located physically most distant from the transmitter as the environment in which the UE1 is located may result in a path-loss that is higher than that of UEs being actually physically closer to the transmitter.

The second transmitter 302 allocates power for a data signal for UE1 to UE3 in a different way in that the UE3 has allocated the highest power, UE2 has allocated the least power and UE1 has allocated a power between the one allocated to UE2 and UE3. Thus, in the embodiment in FIG. 4, at the second transmitter 302, e.g., the path-loss to UE3, which is in the first group 310, is the highest when compared to the other UEs of the set as seen at the second transmitter 302. The path-loss of the UE2, which is in the second group 312, is the lowest, and the path-loss of UE1, which is in the third group 313, has a higher path-loss than the UE2.

The third transmitter 303 allocates the power to the UEs again in a different way in that the UE1, which is in the third group 313, has allocated the least power, i.e., UE1 is closest to the transmitter or shows the lowest path-loss on the channel to the third transmitter 303. UE2, which is in the second group 312, has the highest path-loss or is the farthest away from the third transmitter 303, and UE3, which is in the first group 310, has a path-loss or distance intermediate between the other two UEs, and, therefore, has allocated more power than UE1 but less power than the UE2.

Thus, in accordance with the above described embodiments, the power allocation is used to discriminate signals between the different UEs within one set.

Now, further embodiments of the inventive approach will be described with reference to a downlink scenario in which a set of transmitters is provided to transmit information to receivers or user equipments which are grouped into different group sets. In accordance with embodiments in such a downlink scenario, one UE from each group share the same resources, like the same time and frequency resource elements, REs, provided for the data transmission by the wireless communication system, and the UE from each group receive respective signals, namely signals including unique data for the respective UE, wherein the signals are sent with different power levels which are set according to the above-described power allocation matrix. The power allocated to each group of UEs by a specific transmitter, according to the power allocation matrix, may be chosen according to their respective distance from the transmitter or TPR or dependent on their respective path-loss or signal attenuation on the channel so that all UEs within a specific group, in accordance with embodiments, may share the same power value at a specific transmitter. The UEs receive signals from all the transmitters, which are communicating together. In case the transmitters are coordinated, for example via a backhaul communication, the signals from the different TRPs arrive synchronously at the UEs. In accordance with embodiments, in a similar way as in the conventional DL-MUST approach, a SIC receiver may be provided at each UE to cancel the interference caused by the signals in the same time and frequency resource element but intended for other users, which are within the same set but are members in other groups.

When considering the scenario depicted in FIG. 4 for a downlink scenario, the three transmitters 300-303 and the three user groups 310-313 may be provided, and each group includes three users representing a certain type of receiver, for example, successive interference cancellation (SIC)—see e.g., [R1-163111], parallel interference cancellation (PIC), message passing (MPA)—see e.g., [R1-162155] or elementary signal estimation (ESE)—see e.g., [R1-165021]. Each receiver may receive its unique data from all transmitters 300-303 dependent on the path-loss or a location of the receiver/group. The information may be sent over the same time and frequency resource element for allowing for a high spectral efficiency and for allowing for a large number of receiver groups to be supported. As a channel between a UE/receiver and one of the transmitters may be compromised at any given time, in accordance with embodiments, the same data may be transmitted from all surrounding transmitters so as to provide for a spatial diversity allowing for a higher reliability. In such an embodiment, the data may be received coherently at the respective groups, and an inter-TRP coordination, for example via the above-described backhaul connection or links between the transmitters, may be provided. At the UEs or at the receivers/signal processing circuits implemented in the UEs, a SIC receiver may be provided to allow for the interference cancellation of those signals intended for the receivers/UEs of the set which are in the other groups.

Figure 6:
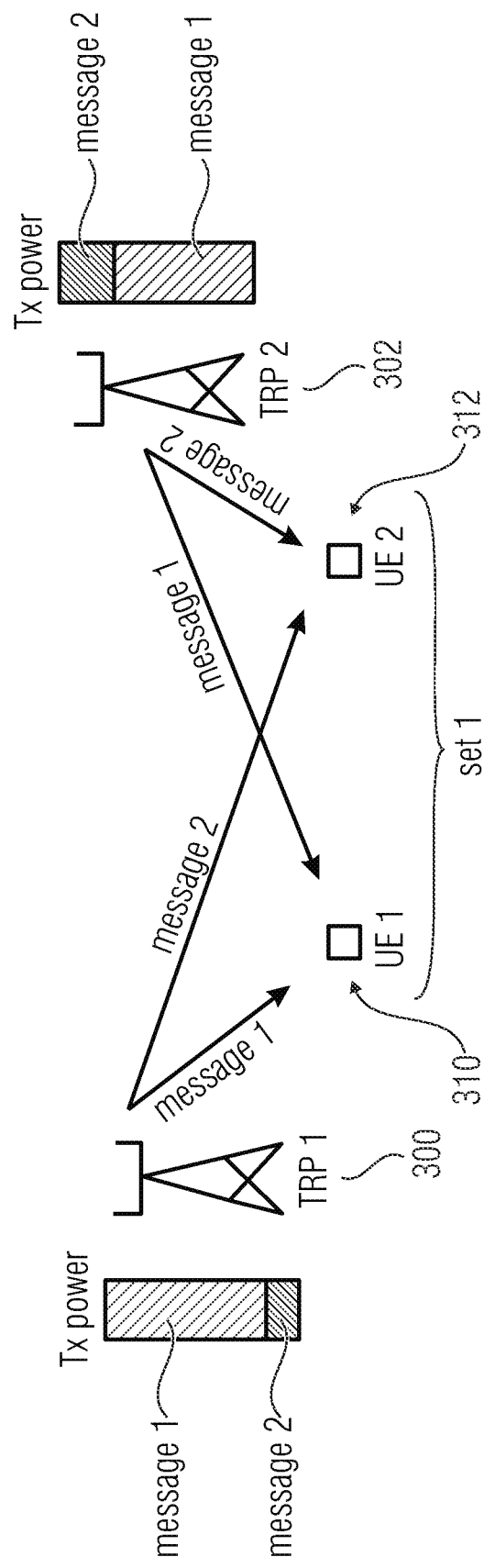
FIG. 6 illustrates an embodiment of the inventive approach in accordance with which UEs are served by two transmission/reception points, the UEs are provided with single antennas, and a diversity transmission is implemented so that a specific UE receives the same message that is transmitted by multiple TRPs.

The inventive transmission scheme may be operated in various configurations, and in the following some embodiments are presented for the 2 user—2 TRP case, however, the principles described herein apply also to cases having a higher number of TRPs/UEs pairs. FIG. 6 illustrates an embodiment of the inventive approach in accordance with which UEs are served by two transmission/reception points wherein the UEs are provided with single antennas and wherein a diversity transmission is implemented so that a specific UE receives the same message that is transmitted by multiple TRPs. The embodiment of FIG. 6 provides for an increased diversity and, as mentioned, each UE, namely UE1 and UE2, and each TRP 300, 302 is assumed to be equipped with a single antenna. The two groups include each the minimum number of UEs, namely only a single UE, so that the first group 310 and the second group 312 each include a single UE, namely UE1 and UE2, respectively. More specifically, UE1 and UE2 are grouped into separate groups 310 and 312 based on their respective relative distance to the respective transmitters 300, 302, for example UE1 is grouped into group 310 as it has a low path-loss on the channel to the transmitter 300 but a higher path-loss on the channel to the transmitter 302. UE2 is grouped into the second group 312 as it has a low path-loss on the channel to the second transmitter 302 while it exhibits the higher path-loss on the channel to the transmitter 300. In accordance with embodiments of the inventive approach, both transmitters 300, 302 use the MUST scheme in order to multiplex both users UE1, UE2, and both transmitters 300, 302 send the same messages to UE1 and UE2 with a specific power allocation. The messages or data signals for UE1 and UE2 are denoted as Message 1 and Message 2, and each UE receives a superposition of both messages. Both UEs include receivers which, in accordance with the described embodiment, apply a successive interference cancellation, SIC, to remove the interfering message from the intended message. Thus, when considering UE1 of group 310, when receiving the superimposed signal from transmitter 300 the intended message is Message 1 and the interfering message is Message 2, and by applying the SIC, the Message 2 is removed from the superimposed signal and the remaining Message 1 is then further processed at UE1. In a similar way, UE2 receives from transmitter 302 the superimposed signal including Message 1 and Message 2 of which Message 1 is the interfering message for UE2 and Message 2 is the intended message for UE2. Again, by applying SIC Message 1 is removed so that the UE can proceed with decoding Message 2 received from the transmitter 302. On the other hand, at UE1 the superimposed signal received from the transmitter 302 does not require a SIC processing as the interfering message, namely Message 2, has a low power level and is treated as a noise term at the UE. In a similar way, the superimposed signal received at UE2 from transmitter 300 is processed without SIC as the Message 1 sent out by transmitter 300 is only seen as a low noise term at the UE2. In other words, when considering the conventional MUST-approach, for the transmitter 300 UE1 is the "near UE" and UE2 is the "far UE", while for transmitter 302, UE2 is the "near UE" and UE1 is the "far UE".

Figure 7A:
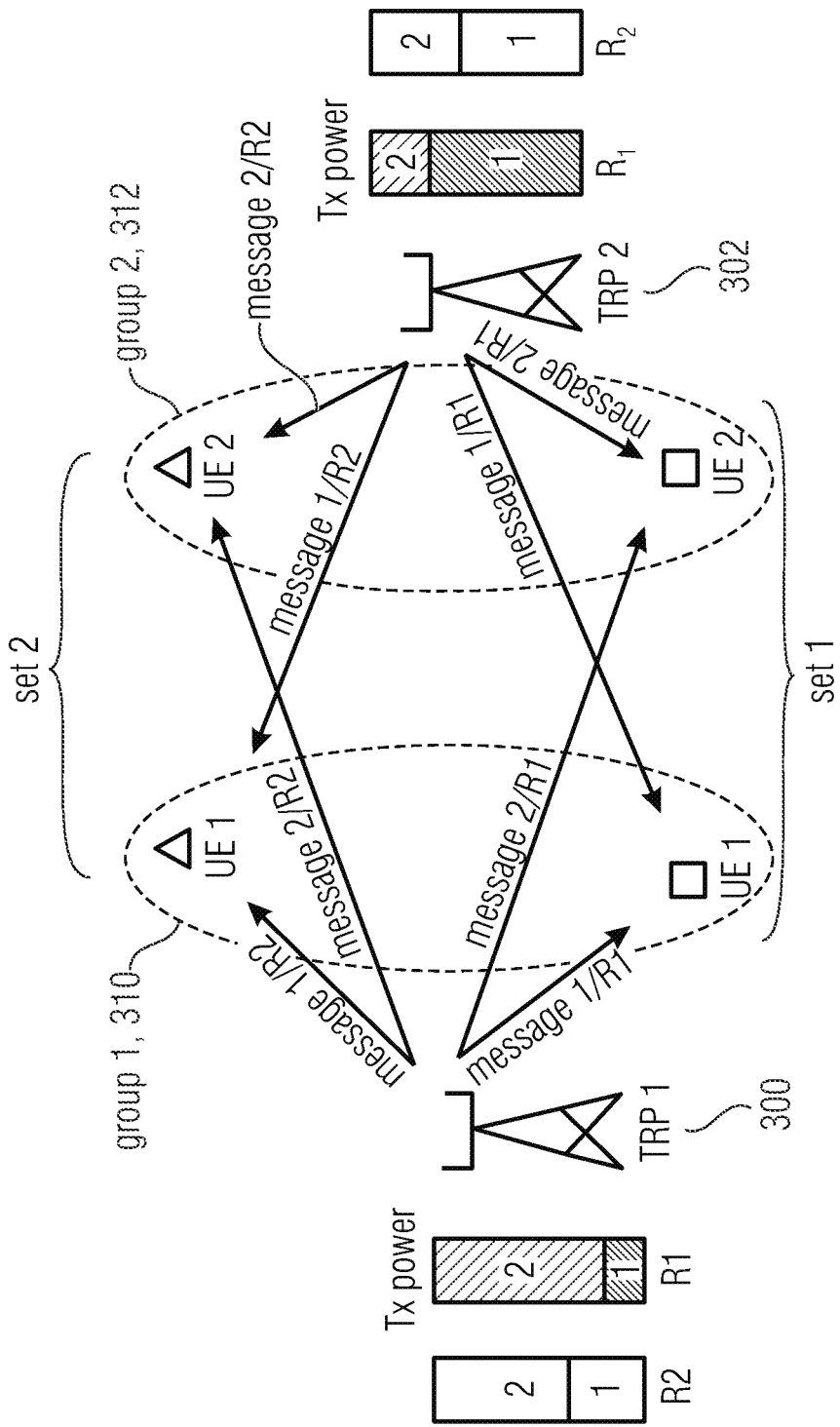
Figure 7B:
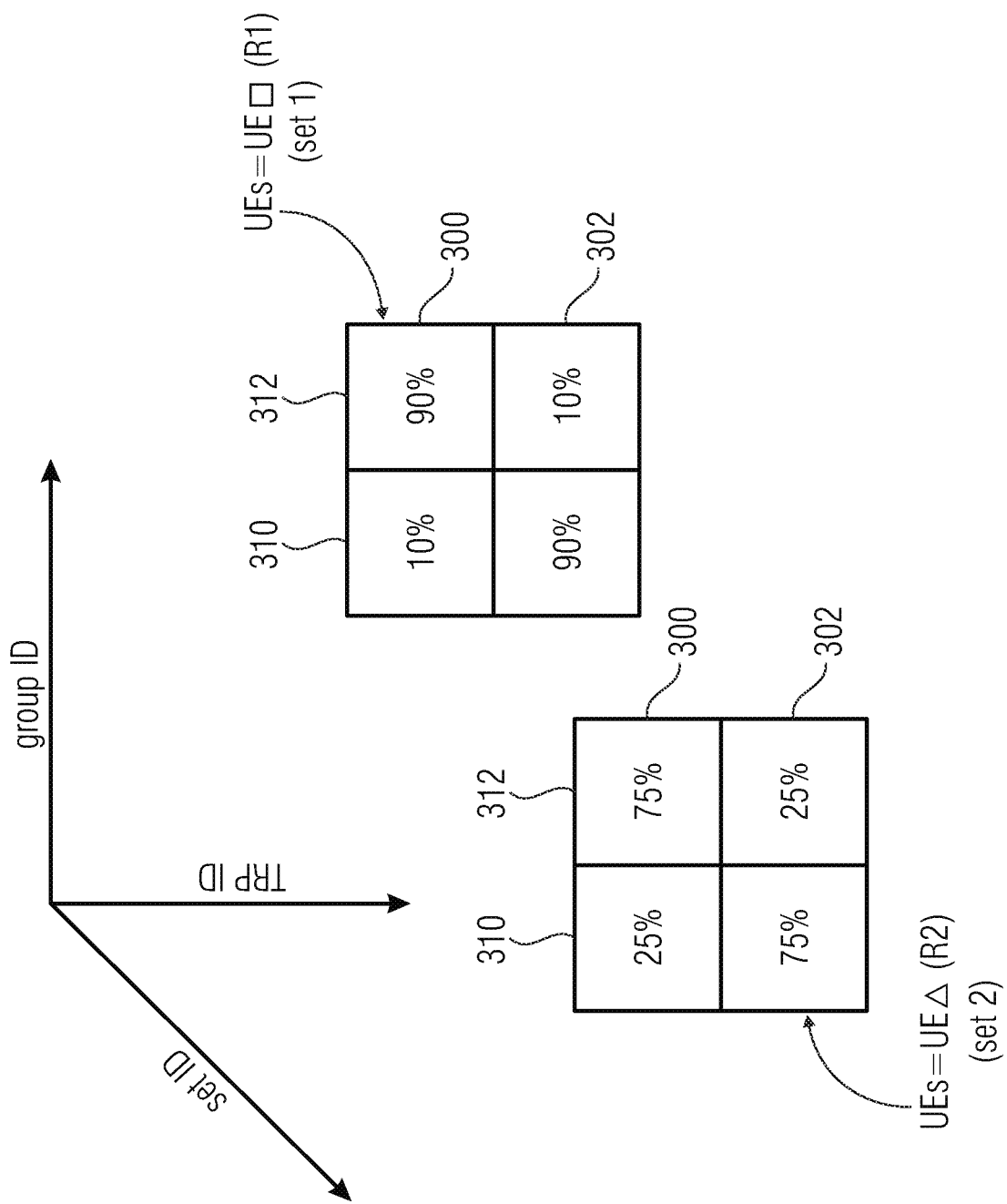

As mentioned above, the scenario depicted in FIG. 6 representing a 2 user—2 TRP case may be extended to a high number of transmitters and/or users, and FIG. 7 shows an embodiment extending the scenario of FIG. 6 to a 4 user/2 transmitter scenario. FIG. 7(a) shows a scenario as in FIG. 6 extended by two additional users so that each group 310, 312 includes a second UE associated with a second set Δ represented by the triangle Δ while the first set □ is represented by the squares. As described above, the UEs within a group use orthogonal resources R1, R2 while the UEs in the respective sets share the same resources R1 and R2, respectively. Further, FIG. 7(a) illustrates the power levels allocated by the respective transmitters 300, 302 to the respective messages send to the UEs, and FIG. 7(b) shows an example of the power allocation matrix, similar to the embodiment of FIG. 5, as it may be used for sharing the information of the NOMA/OMA resource allocation between the UEs and TRPs in the scenario of FIG. 7(a).

As is illustrated in FIG. 7(b), the transmitter 300 allocates for its near UE of the first set □, namely □UE1, a power level representing about 10% of the available transmit power, and for its far UE of the first set □, namely □UE2, a power level representing about 90% of the available transmit power. The transmitter 302 allocates for its near UE of the first set □, namely □UE2, a power level representing about 10% of the available transmit power, and for its far UE of the first set □, namely □UE1, a power level representing about 90% of the available transmit power.

For the second resource used for transmitting to the UEs of the second set Δ a different power allocation scheme is applied allocating to the near UEs 25% of the power and to the far UEs 75% of the power. More specifically, the transmitter 300 allocates for its near UE of the second set Δ, namely ΔUE1, a power level representing about 25% of the available transmit power, and for its far UE of the second set Δ, namely ΔUE2, a power level representing about 75% of the available transmit power. The transmitter 302 allocates for its near UE of the second set Δ, namely ΔUE2, a power level representing about 25% of the available transmit power, and for its far UE of the second set Δ, namely ΔUE1, a power level representing about 75% of the available transmit power.

It is noted that the above mentioned values are just examples and dependent on the circumstances, e.g., the channel condition and the like, the power allocation levels may be different.

Figure 8:
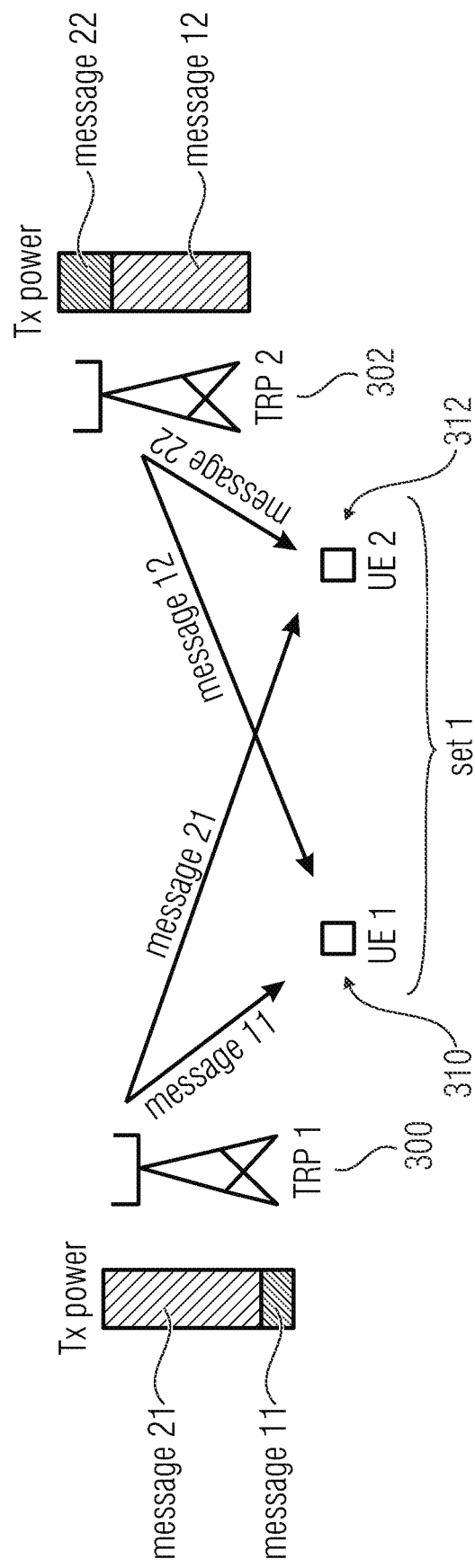
FIG. 8 illustrates a further embodiment of the inventive approach using single antennas and multiplexing in such a way the UEs receive different individual messages transmitted by the multiple transmitters.

FIG. 8 illustrates a further embodiment of the inventive approach using single antennas and multiplexing in such a way the UEs receive different individual messages transmitted by the multiple transmitters. The embodiment of FIG. 8 provides for an increased multiplexing and again each UE/TRP is considered to be equipped with a single antenna and the users are grouped in separate groups in the same way as described above with reference to FIG. 6. Both transmitters use MUST in order to multiplex both users, and the two transmitters 300, 302 sent different individual message to UE1 and UE2 with a specific power allocation. The messages for UE1 are denoted as Message 11 and Message 21, and the messages for UE2 are denoted as Message 12 and Message 22. At each receiver/UE the superposition of both messages is received and each receiver uses successive interference cancellation to remove the interfering message and to decode the intended messages. In the embodiment of FIG. 8, the intended messages for UE1 are Message 11 and Message 12, and the intended messages for UE2 are Message 21 and Message 22. In a similar way as described above with reference to FIG. 6, UE1 uses SIC for obtaining Message 11 from the superimposed signal including Message 11 and Message 21, while no SIC process is needed for decoding Message 12 from transmitter 302. In the same way UE2, acting as the near UE for transmitter 302, uses SIC for cancelling Message 21 so as to be in a position to decode the intended Message 22 and also decodes Message 21 which is an intended message without the SIC process. Thus, the signal processing at the respective UEs for obtaining the intended messages at the respective UE is similar to that described above with reference to FIG. 6.

Figure 9:
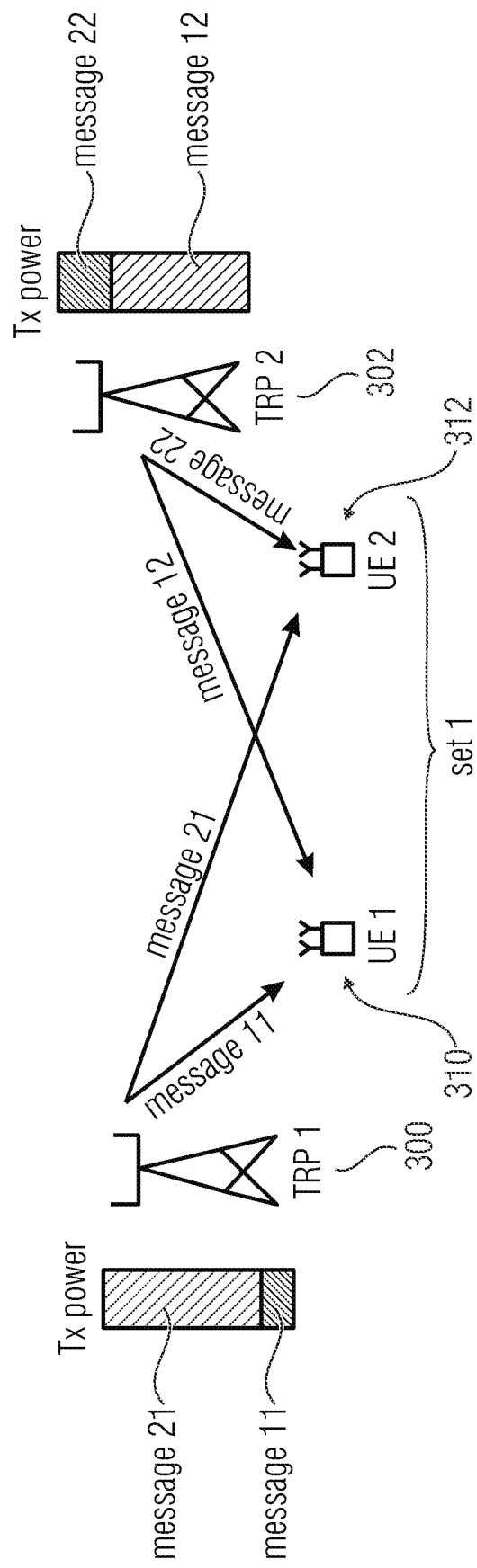
FIG. 9 illustrates another embodiment of the inventive approach providing for an increased multiplexing in combination with a Rx-beamforming.

Yet another embodiment of the inventive approach providing for an increased multiplexing in combination with receive, Rx, beamforming is described with reference to FIG. 9. The UEs, in accordance with the embodiment of FIG. 9, receive the same or different individual messages transmitted by the multiple transmitters, and each of the transmitters is considered to be equipped with a single antenna whereas the UEs are equipped with two or more antennas, for example receive antennas. The users UE1 and UE2 are grouped in a way as described above with reference to FIG. 6, and in accordance with the inventive approach, the two transmitters 300, 302 use a MUST transmission scheme to multiplex both users. Both transmitters send different individual messages to UE1 and UE2 with a specific power allocation, and the messages, like in the embodiment of FIG. 8, are denoted as Message 11 and Message 21 for the UE1 and as Message 12 and Message 22 for UE2. At each UE/receiver a signal is received including a superposition of two messages and each receiver uses SIC to remove the interfering message and Rx-beamforming to separate the intended messages. The SIC processing is performed in a way as described above with reference to FIG. 6, and the additional Rx-beamforming allows for directing, for example, two receive beams of the antenna array of the respective UE into the different directions from which the respective intended messages are received.

The embodiments described above with reference to FIG. 6 to FIG. 9 concern downlink scenarios, however, the inventive approach is equally applicable for uplink scenarios. For example, when considering a plurality of UEs, like sensors, such sensors may send their measuring results so that for an uplink scenario, the sensors/UEs may be grouped in the different groups to transmit information to all TRPs. Thus, in the uplink scenario one UE from each group share the same time and frequency resource elements, REs, but each UE transmits its own unique data. The UEs transmit signals to all TRPs, which may be communicating together, for example via a backhaul connection (UL-CoMP).

In accordance with embodiments it may be desired that the signals sent from the respective UEs/sensors arrive at a specific transmission/reception point coherently, which may be ensured by restricting the time delay between the sensors in different groups to be within the CP duration so that no coordination is needed, i.e., in such a scenario that no backhaul connection among the respective transmitters is required.

In accordance with embodiments, the uplink may include different types of transmissions, which include a regular transmission and an event trigger transmission. The regular transmission may use regular transmission intervals for a continuous monitoring, and the transmission intervals may be simply chosen and fixed to each group. This may be communicated to each group in the connection setup phase by the nearest TRP. The event trigger transmission may be such that the system switches to an orthogonal transmission scheme or transmits the event triggered signal with a maximum allowed power for the UEs so that other signals from other UEs or sensors can be simply discarded as noise. Such an event trigger transmission may be caused in exceptional circumstances, like emergency states, so that it does not occur often and therefore, being implemented, provides no loss in the overall system efficiency.

Now, further embodiments of the inventive approach combining joint transmission with non-orthogonal multiple access scheme are described.

User Grouping Mechanism

In accordance with embodiments, users may be grouped using different mechanisms dependent on whether the location of the user is known or unknown and dependent on whether the user is mobile or not. In case the location of a mobile user or a non-mobile user is not known, the UEs within the area to be served by the plurality of transmitters using CoMP may be located using one or more of the reference signal receive power, RSRP, the reference signal received quality, RSRQ the angle of arrival, AoA, the angle of departure, AoD, and the delay of arrival, DoA. On the basis of the location determined, the UEs may be grouped according to their physical location.

In accordance with other embodiments, for grouping the users, instead of the physical location, the above mentioned second order channel characteristics may be used, like the path-loss or signal attenuation on the channel to a respective transmitter.

In case the location of the UEs is fixed and does not change, in accordance with other embodiments, the group ID may be pre-defined for the already grouped users and only the group ID is communicated during the uplink and the downlink to indicate to which group each UE belongs so as to allow, for example, for the power allocation that may be effected by the respective transmitters when serving the plurality of users in accordance with the inventive approach.

Time Delay Restriction for Uplink

In case it is desired that signals from the UEs arrive at a specific transmitter synchronously during an uplink transmission, the time delay between the different groups/transmitters, in accordance with embodiments, may be restricted to be within the CP duration so that no coordination of the different UEs is needed.

Signaling Between TRPs in CoMP

In accordance with embodiments, the transmitters or TRPs forming the CoMP cluster may communicate with each other, for example via a backhaul connection, so as to indicate, for example, one or more of the following:
 the indicator matrix as described above with reference to FIG. 5,
 the times at which the respective TRPs are planning to transmit,
 feedback information from the nearest UE groups regarding the relative phases of all TRPs so as to ensure that signals transmitted by all TRPs are received coherently at all UE groups,
 indices for the power allocation matrix and the precoding matrix are chosen by each UE group.

During the uplink the following information may be exchanged among the TRPs:
 NOMA layer ID to indicate the sequence index per UE so as to improve decoding of superimposed signals at the TRPs. For example, different TRPs may receive the superposition of messages with different quality, and for proper decoding the superimposed signals the sequence index may be used,
 sharing the NOMA-layer ID per group/per UE,
 estimates of decoded messages as input for local decoding.

Signaling From a UE to a TRP

In accordance with embodiments, the sounding reference signal, SRS, may be used to feedback from each UE group the relative phase between each UE and all TRPs to that TRP which is nearest to the UE providing the feedback. This information may be exchanged between the TRPs and may be used to provide for a coherent transmission during the downlink. This may also be used to indicate to the TRPs the power allocation matrix indexed to be used as well as the precoding matrix to be used for the downlink transmission to each UE group.

Signaling from a TRP to UEs

In accordance with embodiments information is signaled from the TRP to the different UE groups to be used at the receivers of the respective UEs to allow for a correct decoding and a correct SIC of the superimposed signals at each user group. For example, the type of waveform, WF, used for modulating the data at the UEs for each group may be signaled so that this information is used by each UE to decode the signal intended for other UEs first by applying, for example, SIC, and then the UE may decode its own signal.

In the above-described embodiments, reference has been made to base stations, however, the inventive approach is not limited to base stations as described above with reference to FIG. 1 or FIG. 2, rather, it applies to any transmitter or transceiver apparatus in a wireless communication network or system for providing a wireless communication with a user equipment having a configuration as outlined above. Thus, the transceivers or transmitters in accordance with the inventive approach may comprise the above-described base stations but also other entities, like road side units, moving base stations, street furniture (e.g. lamp posts, traffic lights, bus stops, . . .), platoon leaders.

Further, in the above-described embodiments, reference has been made to a transmission of data from the transmitters to the UEs, like a downlink, DL, communication, however, the inventive approach is not limited to this. Rather, the inventive approach may also be applied for an uplink, UL, communication from the UEs to the transmitters using the superimposed signals that are received at the plurality of transmitters.

Figure 2:
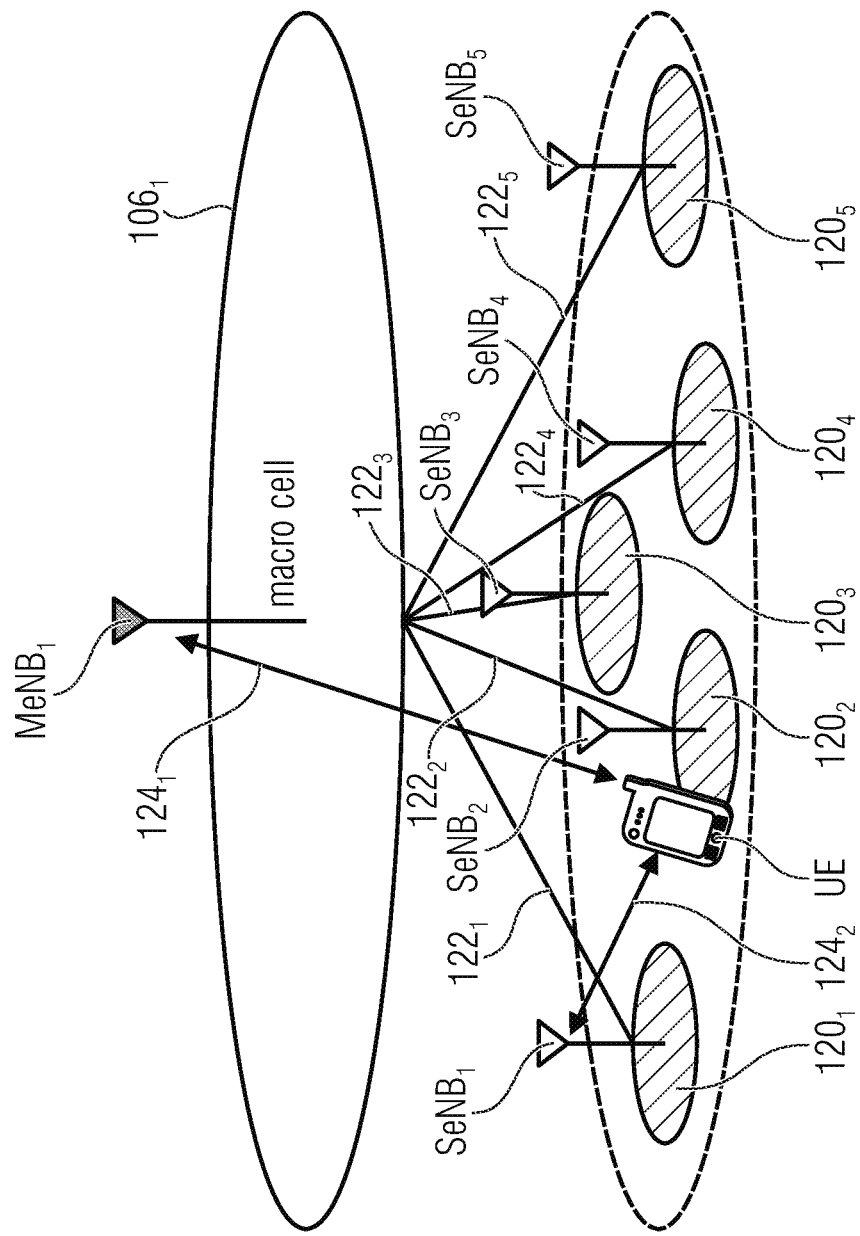
FIG. 2 is a schematic representation of a cell in FIG. 1 having two distinct overlaid networks, the networks comprising a macro cell network including a macro cell and a small cell network.
Figure 3:
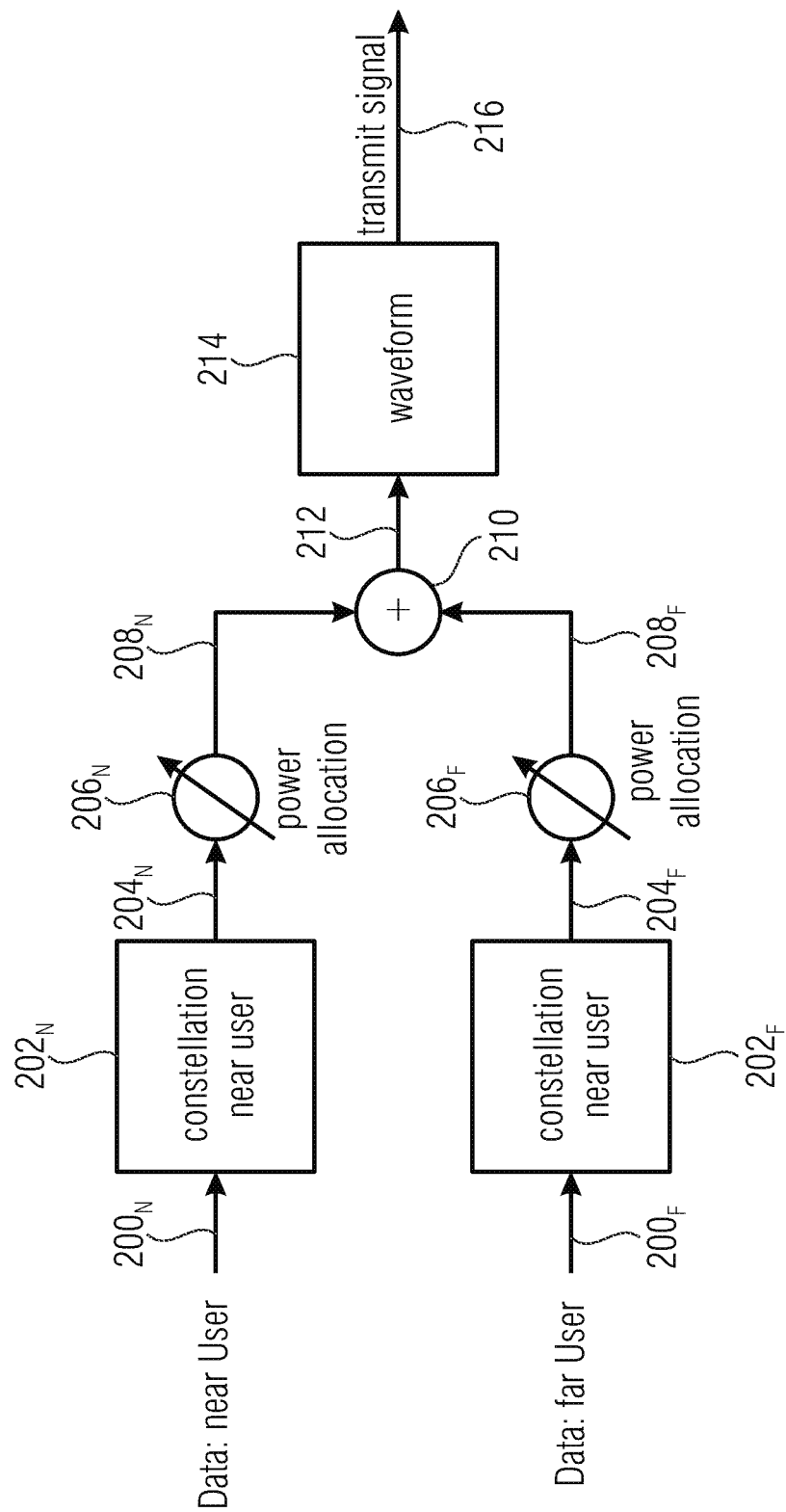
FIG. 3 is a block diagram illustrating the principle of the multi-user superposition transmission, MUST, scheme.
Figure 10:
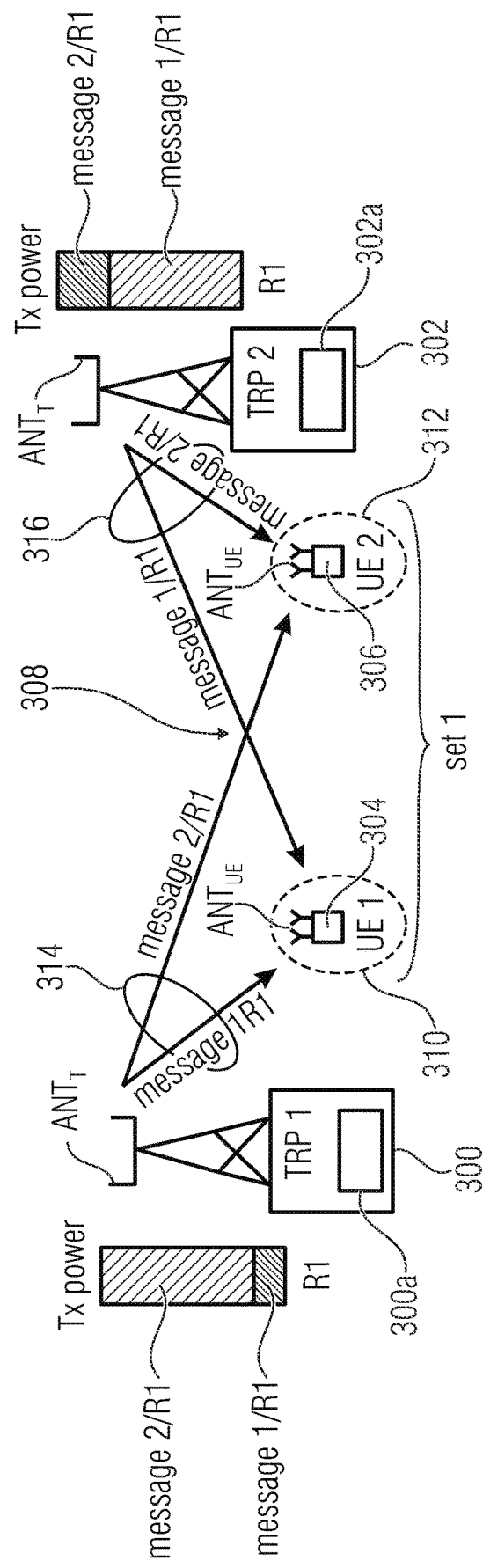
FIG. 10 is a schematic representation of a wireless communication system for communicating information between a plurality of transmitters and a plurality of UEs operating in accordance with an embodiment of the present invention.

Embodiments of the present invention may be implemented in a wireless communication system as depicted in FIG. 1 or FIG. 2 including base stations and users, like mobile or stationary terminals or IoT devices. FIG. 10 is a schematic representation of a wireless communication system for communicating information between a first transmitter or transceiver 300, a second transmitter or transceiver 302 and a plurality of UEs 304, 306. The transmitters 300, 302 and the UEs 304, 306 may communicate via wireless communication links 308, like a radio link, using the same resources. Each of the transmitters 300, 302 include one or more antennas $ANT_T$ or an antenna array having a plurality of antenna elements, and a signal processor 300a, 302a. The transmitters 300, 302 may operate in accordance with the inventive teachings described herein. Each of the UEs 304 and 306 includes one or more antennas $ANT_{UE}$ or an antenna array having a plurality of antenna elements, and a signal processor 302a, 304a. The UEs 304, 306 may operate in accordance with the inventive teachings described herein.

In accordance with an aspect of the inventive approach, a wireless communication system is provided in which data of the first UE 304 and data of the second UE 306 are transmitted by or received at the first and second transmitters 300, 302 on resources R1 shared by the first UE 304 and the second UE 306. The first transmitter 300, e.g. using its signal processor 300a, performs a superimposed non-orthogonal multiple access, NOMA, transmission or reception, e.g., a multi-user superposition transmission, MUST, of a first data signal Message1/R1 of the first UE 304 and a second data signal Message2/R1 of the second UE 306. The second transmitter 302, e.g. using its signal processor 302a, performs a superimposed non-orthogonal multiple access, NOMA, transmission or reception, e.g., a multi-user superposition transmission, MUST, of a third data signal Message1/R1 of the first UE 304 and a fourth data signal Message2/R1 of the second UE 306.

In accordance with another aspect of the inventive approach, a wireless communication system is provided in which data of the first UE 304 and data of the second UE 306 are transmitted by or received at the first and second transmitters 300, 302 on resources R1 shared by the first UE 304 and the second UE 306. The wireless communication system includes a first group 310 of user equipments and a second group 312 of user equipments. The first group 310 includes at least one user equipment 304, and all user equipments within the first group 310 use orthogonal resources. The second group 312 includes at least one user equipment 306, and all user equipments within the second group use orthogonal resources. At least one user equipment 304 in the first group 310 and at least one user equipment 306 in the second group 32 share the same orthogonal resources R1. Data of the first user equipment 304 in the first group 310 and data of the second user equipment 306 in the second group 312 are transmitted or received on the resources R1 shared by the first user equipment 304 and the second user equipment 306. The first transmitter 300, e.g. using its signal processor 300a, transmits or receives a first superimposed signal 314 including a first data signal Message1/R1 of the first user equipment 304 and a second data signal Message2/R1 of the second user equipment 306. The second transmitter 306, e.g. using its signal processor 300a, transmits or receives a second superimposed signal including a third data signal Message1/R1 of the first user equipment 304 and a fourth data signal Message2/R1 of the second user equipment 306.

In accordance with embodiments the multi-user superposition transmission or reception operates on the basis of different power levels allocated to the respective data signals. For example, as is depicted in FIG. 10, the first data signal Message1/R1 has allocated a first power level, the second data signal Message2/R1 has allocated a second power level, the third data signal Message1/R1 has allocated a third power level, and the fourth data signal Message1/R1 has allocated a fourth power level. The first and fourth power levels are lower than the second and third power level.

In accordance with yet another aspect of the inventive approach, a transmitter 300 is provided. The transmitter 300, e.g. using its signal processor 300a, transmits data for the first user equipment UE1 and data for the second user equipment UE2 on the resources 306 of the wireless communication system which are shared by the first user equipment UE1 and the second user equipment UE2. Further data for the first and second user equipments UE1, UE2 is transmitted by the further transmitter 302 of the wireless communication system. The transmitter 300 transmits a superimposed signal including a first data signal for the first user equipment UE1 and a second data signal for the second user equipment UE2.

In accordance with embodiments, the data for the first and second user equipments UE1, UE2 includes a plurality of parts or messages so that a specific UE receives a first part or message of its data from the transmitter 300, and the other parts or messages of the data are received from other transmitters, e.g. the further transmitter 302 may transmit a second part or message of the data for the respective UE. For example, the plurality of parts or messages of the data may be the same message or a copy of the data, thereby providing for an increased diversity. The plurality of parts or messages of the data may be different individual messages transmitted by the multiple transmitters, thereby providing for an increased multiplexing.

In accordance with a further aspect of the inventive approach, a user equipment UE1 is provided. The user equipment UE1 shares with a further user equipment UE2 the resources 306 of the wireless communication system. The user equipment UE1 receives data from a plurality of transmitters 300, 302 of the wireless communication system. The user equipment UE1 receives and processes, e.g. using its signal processor—not shown, a first superimposed signal from the first transmitter 300 and a second superimposed signal from the second transmitter 302 so as to obtain from the first and second superimposed signals the data designated for the user equipment UE1. The first superimposed signal includes a first data signal for the user equipment UE1 and a data signal for the further user equipment UE2, and the second superimposed signal includes a second data signal for the user equipment UE1 and a data signal for the further user equipment UE2.

In accordance with embodiments, the data for the user equipment UE includes a plurality of parts or messages so that a specific UE receives a first part or message of its data from the transmitter 300, and the other parts or messages of the data are received from other transmitters, e.g. the further transmitter 302 may transmit a second part of message of the data for the respective UE. For example, the plurality of parts or messages of the data may be the same message or a copy of the data, thereby providing for an increased diversity. The plurality of parts or messages of the data may be different individual messages transmitted by the multiple transmitters, thereby providing for an increased multiplexing.

Figure 11:
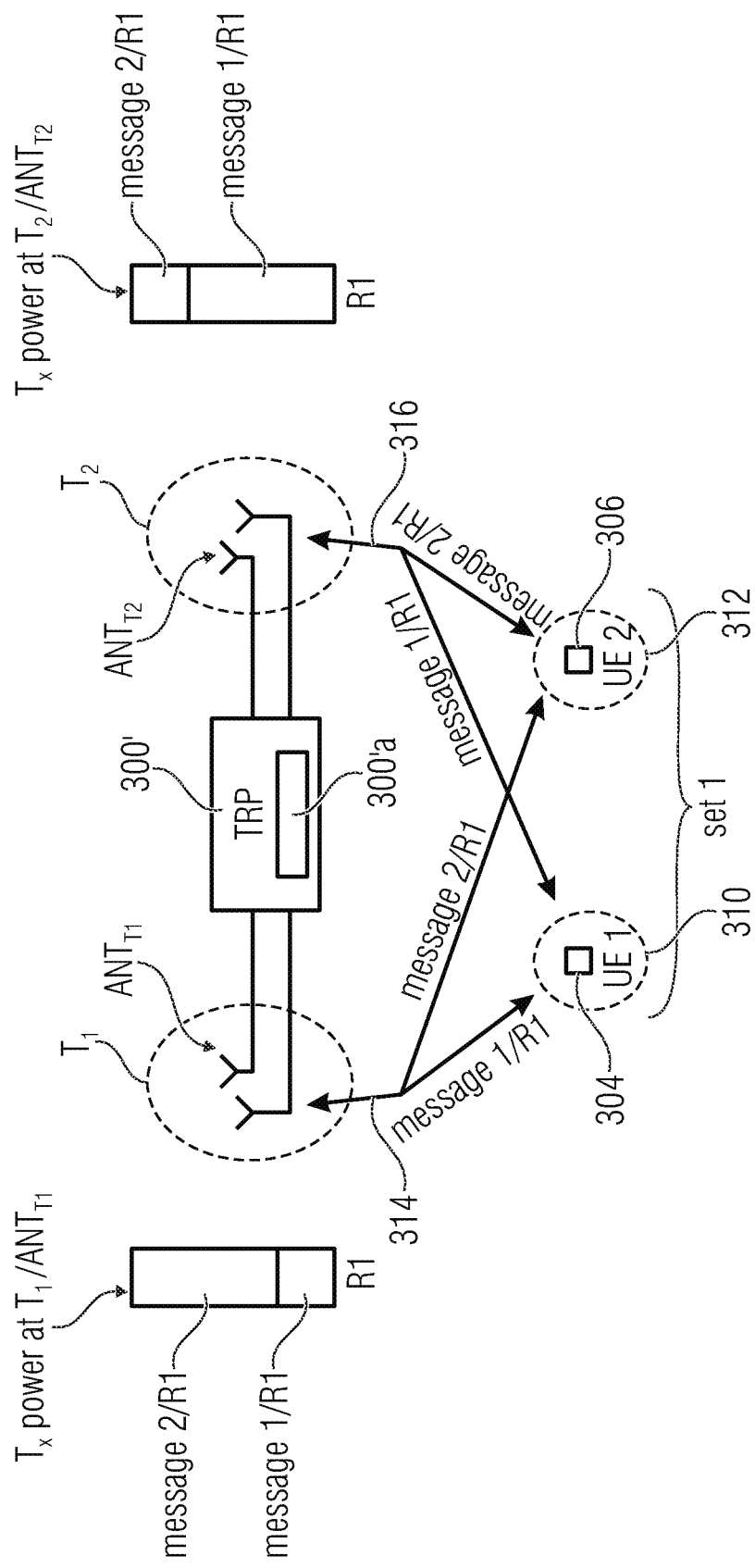
FIG. 11 is a schematic representation of a wireless communication system for communicating information between a plurality of transmitters and a plurality of UEs operating in accordance with an embodiment of the present invention in which the transmitters are formed of respective antennas of common apparatus, like a base station or TRP.

Further, in the above-described embodiments, reference has been made to the plurality of transmitters as separate entities, like separate base stations, separate TRPs or the like, of the wireless communication system, as is shown for example in FIG. 10. However, the inventive approach is not limited to this, rather, the plurality of transmitters may be formed of one or more of the antennas or of one or more antenna elements of the antennas $ANT_T$ of a single or common entity, like a base station or a TRP. FIG. 11 is a schematic representation of a wireless communication system for communicating information between a plurality of transmitters and a plurality of UEs operating in accordance with an embodiment of the present invention similar to FIG. 10 in which, however, the transmitters $T_1$ and $T_2$ are formed of respective antennas $ANT_{T1}$ and $ANT_{T2}$ of common apparatus 300', like a base station or TRP. In other words, the first transmitter $T_1$, which transmits/receives the superimposed signal 314 including Message1/R1, Message2/R1 in accordance with the inventive approach may be formed of a first number of antennas $ANT_{T1}$ of a base station 300', first number of antennas $ANT_{T1}$ located, e.g., long a first section of a street. A the a second transmitter $T_2$, which transmits/receives the superimposed signal 316 including Message1/R1, Message2/R1 in accordance with the inventive approach may be formed of a second number of antennas $ANT_{T2}$ of the base station 300', the second number of antennas $ANT_{T2}$ located, e.g., long a second section of a street. One or more additional transmitters may be formed of a respective further numbers of antennas of the base station. The number of antennas used for forming the respective transmitters may be the same or may be different. The base station 300' may provide respective signal processing resources 300a' for the respective transmitters $T_1$, $T_2$, or the transmitters $T_1$, $T_2$ may share the base station's signal processing resources 300a'.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.859 v13.0.0 (2015-12)

The invention claimed is:

1. A user equipment configured for a communication in a wireless communication system, the wireless communication system comprising a plurality of user equipments and a plurality of transmission/reception points (TRPs) the plurality of TRPs comprising at least a first TRP and a second TRP, wherein the user equipment is a member of a group of user equipments, the group including two or more user equipments for which second order channel statistics for at least one channel parameter between the first and second TRPs and the user equipment are within a certain range, or two or more user equipments which are in a certain geographical area or coverage footprint relative to the first and second TRPs, wherein the user equipment is configured to communicate with the first and second TRPs using first resources, the first resources being orthogonal to second resources used by another user equipment of the group, and wherein, for transmitting or receiving data of the user equipment, the user equipment is to transmit to or receive from the first TRP a first superimposed signal using the resources of the first TRP and comprising a data signal of the user equipment superimposed with a data signal of a further user equipment being a member of a further group of user equipments, and transmit to or receive from the second TRP a second superimposed signal using resources of the second TRP and comprising a further data signal of the further user equipment superimposed with a further data signal of the user equipment.

2. The user equipment of claim 1, wherein the second order channel statistics includes power levels such as a downlink Reference Signal Received Power (RSRP), or a Received Signal Strength Indication (RSSI), or a Reference Signal Received Quality (RSRQ).

3. The user equipment of claim 1, wherein
the data signal and the further data signal of the user equipment are identical or different, and/or wherein the data signal and the further data signal of the further user equipment are identical or different, and
the resources of the first TRP and the resources of the second TRP are identical or are different.

4. The user equipment of claim 3, wherein, in case the resources of the first TRP and the resources of the second TRP are identical, the resources of the first and second TRPs are the first resources or are the second resources.

5. The user equipment of claim 1, wherein the data signal and the further data signal are superimposed using a non-orthogonal multiple access (NOMA) transmission or reception scheme.

6. The user equipment of claim 5, wherein
the resources are defined by an orthogonal multiple access (OMA) transmission scheme of the wireless communication system, like a Time Division Multiple Access (TDMA), a Frequency Division Multiple Access (FDMA), an Orthogonal Frequency Division Multiple Access (OFDMA), or a Code Division Multiple Access (CDMA), and
the NOMA transmission and reception scheme applies different power levels to the signals to be superimposed or applies different spreading sequences to the signals to be superimposed, or applies different phases to the signals.

7. The user equipment of claim 1, wherein the user equipment is to receive from the first TRP and from the second TRP information allowing the user equipment to correctly decode and SIC process the received first and second superimposed signals.

8. The user equipment of claim 1, wherein
the second order channel statistics within the certain range include values for the second order channel statistics being the same or being similar in that the values are within a predefined range of values, or the certain geographical area or coverage footprint is located at a first distance from the first TRP and at a second distance from the second TRP, the first distance being different from the second distance.

9. The user equipment of claim 1, wherein
the data of the user equipment includes a plurality of parts or a plurality of messages, the plurality of parts including at least a first part and a second part, and the plurality of messages including at least a first message and a second message, and
the plurality of parts include the same or different data, and the plurality of messages include the same or different messages.

10. The user equipment of claim 1, wherein the user equipment is configured to process the superimposed signals received from the first and second TRPs using successive interference cancellation (SIC) to remove an interfering message.

11. The user equipment of claim 1, wherein the user equipment includes a plurality of antennas and is configured to perform receive (Rx) beamforming in order to separate signals received from different TRPs.

12. The user equipment of claim 1, wherein, for an uplink transmission, a time delay between the user equipment and the further user equipment of the further group is set to be within a cyclic prefix (CP) duration so that no coordination is needed and the signals arrive at the TRPs within the CP.

13. The user equipment of claim 1, wherein the user equipment is configured to receive information for controlling a transmission of signals among the first and second TRPs and the user equipments, and
the exchanged information includes one or more of
feedback information from the nearest groups regarding the relative phases of the TRPs serving the user equipments in the groups so as to ensure that signals transmitted by the TRPs are received coherently at the groups,
an average path loss and/or a received power to/at the user equipments in a group,
spatial properties of a multiple input multiple output (MIMO) link between a TRP and a group,
information indicating when the respective TRPs are planning to transmit,
an indicator matrix indicating a resource allocation between the TRPs and the user equipments,
power allocation matrix and precoding matrix indices chosen by each group.

14. The user equipment of claim 1, wherein the further group includes
two or more user equipments for which second order channel statistics for at least one channel parameter between the first and second TRPs and the user equipment are within a further certain range, or
two or more user equipments which are in a further certain geographical area or coverage footprint relative to the first and second TRPs.

15. A transmission/reception point (TRP) for a wireless communication system data, the wireless communication system comprising a plurality of user equipments and a plurality of transmission/reception points (TRPs), the plurality of TRPs comprising at least a first TRP and a second TRP,
wherein the TRP is to transmit or receive data of a first user equipment and of a second user equipment, the first user equipment being a member of a first group of user equipments, the first group including two or more user equipments for which second order channel statistics for at least one channel parameter between the first and second TRPs and the user equipment are within a first range, or two or more user equipments which are in a first geographical area or coverage footprint relative to the first and second TRPs, and the second user equipment being a member of a second group of user equipments, the second group including two or more user equipments for which second order channel statistics for at least one channel parameter between the first and second TRPs and the user equipment are within a second range, or two or more user equipments which are in a second geographical area or coverage footprint relative to the first and second TRPs, and wherein, for transmitting or receiving data of the first user equipment and of the second user equipment, the TRP is to transmit or receive a first superimposed signal using first resources and comprising a data signal of the first user equipment superimposed with a data signal of the second user equipment, the first resources being orthogonal to second resources used by further user equipments of the first and second groups, and transmit or receive a second superimposed signal using the first resources and comprising a further data signal of the second user equipment superimposed with a further data signal first user equipment.

16. A wireless communication system, comprising:
a plurality of transmission/reception points (TRPs) according to claim 15, wherein the plurality of TRPs comprises at least a first TRP and a second TRP, and
a plurality of user equipments, the user equipments configured for a communication in the wireless communication system, wherein the user equipment is a member of a group of user equipments, the group including
two or more user equipments for which second order channel statistics for at least one channel parameter between the first and second TRPs and the user equipment are within a certain range, or
two or more user equipments which are in a certain geographical area or coverage footprint relative to the first and second TRPs,
wherein the user equipment is configured to communicate with the first and second TRPs using first resources, the first resources being orthogonal to second resources used by another user equipment of the group, and
wherein, for transmitting or receiving data of the user equipment, the user equipment is to
transmit to or receive from the first TRP a first superimposed signal using the resources of the first TRP and comprising a data signal of the user equipment superimposed with a data signal of a further user equipment being a member of a further group of user equipments, and
transmit to or receive from the second TRP a second superimposed signal using resources of the second TRP and comprising a further data signal of the further user equipment superimposed with a further data signal of the user equipment.

17. The wireless communication system of claim 16, wherein
the first TRP and the second TRP are configured to exchange information for controlling a transmission of signals among the first and second TRPs and the user equipments, and
the exchanged information includes one or more of
feedback information from the nearest groups regarding the relative phases of the TRPs serving the user equipments in the groups so as to ensure that signals transmitted by the TRPs are received coherently at the groups,
an average path loss and/or a received power to/at the user equipments in a group,
spatial properties of a multiple input multiple output, MIMO, link between a TRP and a group,
information indicating when the respective TRPs are planning to transmit,
an indicator matrix indicating a resource allocation between the TRPs and the user equipments,
power allocation matrix and precoding matrix indices chosen by each group.

18. The wireless communication system of claim 16, wherein the TRPs and the user equipments are configured to share an indicator matrix, the indicator matrix indicating a resource allocation between the TRPs and the user equipments, the indicator matrix including the resource allocation for each TRP/user equipment pair.

19. The wireless communication system of claim 16, wherein
the plurality of TRPs includes at least one further TRP, and the wireless communication system further includes at least another group of user equipments having second order channel statistics when served by the TRP for the user equipments in the further group, or being located in another geographical area or coverage footprint relative to the TRPs serving the user equipments in the other group, the other group including a plurality of user equipments using orthogonal resources.

20. A method for transmitting or receiving data of a user equipment in a wireless communication system data,
wherein the wireless communication system comprises a plurality of user equipments and a plurality of transmission/reception points, TRPs, the plurality of TRPs comprising at least a first TRP and a second TRP,
wherein the user equipment is a member of a group of user equipments, the group including
two or more user equipments for which second order channel statistics for at least one channel parameter between the first and second TRPs and the user equipment are within a certain range, or
two or more user equipments which are in a certain geographical area or coverage footprint relative to the first and second TRPs, and
wherein the method comprises:
communicating with the first and second TRPs using first resources, the first resources being orthogonal to second resources used by another user equipment of the group, and
for transmitting or receiving data of the user equipment
transmitting to or receiving from the first TRP a first superimposed signal using resources of the first TRP and comprising a data signal of the user equipment superimposed with a data signal of a further user equipment being a member of a further group of user equipments, and
transmitting to or receiving from the second TRP a second superimposed signal using resources of the second TRP and comprising a further data signal of the further user equipment superimposed with a further data signal of the user equipment.

* * * * *